(12) United States Patent
Maria et al.

(10) Patent No.: US 11,470,017 B2
(45) Date of Patent: Oct. 11, 2022

(54) IMMERSIVE REALITY COMPONENT MANAGEMENT VIA A REDUCED COMPETITION CORE NETWORK COMPONENT

(71) Applicants: AT&T Intellectual Property I, L.P., Atlanta, GA (US); AT&T Mobility II LLC, Atlanta, GA (US)

(72) Inventors: Arturo Maria, Bellevue, WA (US); Alexander E. Silverman, Mercer Island, WA (US); Jeffrey Joseph Farah, North Brunswick, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 35 days.

(21) Appl. No.: 16/526,799

(22) Filed: Jul. 30, 2019

(65) Prior Publication Data
US 2021/0036964 A1  Feb. 4, 2021

(51) Int. Cl.
| | |
|---|---|
| H04L 47/70 | (2022.01) |
| G06F 3/01 | (2006.01) |
| H04B 1/3827 | (2015.01) |
| H04L 43/08 | (2022.01) |
| H04L 67/12 | (2022.01) |

(52) U.S. Cl.
CPC .......... *H04L 47/821* (2013.01); *G06F 3/011* (2013.01); *H04B 1/385* (2013.01); *H04L 43/08* (2013.01); *H04L 67/12* (2013.01)

(58) Field of Classification Search
CPC ....... H04L 47/821; H04L 43/08; H04L 67/12; G06F 3/011; H04B 1/385
See application file for complete search history.

(56) References Cited

U.S. PATENT DOCUMENTS 5,274,782 A * 12/1993 Chalasani ......... G06F 15/17393
710/317
9,286,711 B2 * 3/2016 Geisner ................. G06T 19/006
(Continued)

*Primary Examiner* — Charles L Beard
(74) *Attorney, Agent, or Firm* — Amin, Turocy & Watson, LLP

(57) ABSTRACT

Management of immersive reality devices via a reduced competition core network component is disclosed. The reduced competition core network component can preferentially be reserved for immersive reality device data and can therefore exclude some or all other types of data typically associated with conventional wireless network devices, e.g., phone, tablet/laptop computers, IoT devices, etc. This can result in immersive reality data communication that does not have to compete with more generic data types for network or computing resources. Additionally, the reduced competition core network component can be divided into at least one reduced competition user-plane network component and at least one reduced competition control-plane network component. Use of a reduced competition user-plane network component can avoid generating additional carrier network traffic. Further, a reduced competition user-plane network component can facilitate non-carrier entity authentication, security protocols, etc. Hierarchical network component topology can enable rule-based access to computing and network resources.

20 Claims, 10 Drawing Sheets

(56) References Cited

U.S. PATENT DOCUMENTS

| | | | |
|---|---|---|---|
| 9,866,286 B1* | 1/2018 | Qu | G01S 17/89 |
| 10,264,507 B2* | 4/2019 | Tan | H04L 45/24 |
| 10,331,590 B2* | 6/2019 | MacNamara | G06F 13/28 |
| 10,438,262 B1* | 10/2019 | Helmer | G09G 3/003 |
| 10,554,931 B1* | 2/2020 | Zavesky | G06K 9/6215 |
| 10,569,164 B1* | 2/2020 | Bleasdale-Shepherd | A63F 13/86 |
| 10,624,148 B1* | 4/2020 | Bainbridge | H04L 67/568 |
| 10,732,721 B1* | 8/2020 | Clements | G02B 30/56 |
| 10,880,208 B1* | 12/2020 | Chandra | H04L 45/586 |
| 10,880,232 B1* | 12/2020 | Goodman | H04L 47/76 |
| 10,911,993 B2* | 2/2021 | Pakniat | H04W 36/0083 |
| 10,924,429 B1* | 2/2021 | Gupta | H04L 47/828 |
| 11,138,803 B1* | 10/2021 | Abdel-Wahab | G06F 3/011 |
| 11,206,205 B1* | 12/2021 | Gupta | H04L 41/0893 |
| 11,252,655 B1* | 2/2022 | Gupta | H04L 41/0806 |
| 11,310,733 B1* | 4/2022 | Gupta | H04W 4/60 |
| 11,336,011 B2* | 5/2022 | Tran | H04W 4/40 |
| 2007/0291654 A1* | 12/2007 | Pepper | H04L 49/90 370/252 |
| 2008/0052401 A1* | 2/2008 | Bugenhagen | H04L 63/102 709/227 |
| 2009/0069642 A1* | 3/2009 | Gao | G06F 19/3418 600/300 |
| 2010/0281231 A1* | 11/2010 | Krishnan | G06F 13/161 711/E12.001 |
| 2010/0325416 A1* | 12/2010 | Haddad | H04L 63/1458 713/150 |
| 2011/0022857 A1* | 1/2011 | Nussbaum | G06F 1/3296 713/300 |
| 2011/0276699 A1* | 11/2011 | Pedersen | H04L 47/24 709/227 |
| 2011/0314145 A1* | 12/2011 | Raleigh | H04W 48/16 709/224 |
| 2012/0139941 A1* | 6/2012 | Sakurai | G06F 1/1698 345/633 |
| 2012/0233311 A1* | 9/2012 | Parker | H04L 43/022 709/224 |
| 2012/0303835 A1* | 11/2012 | Kempf | H04L 43/0882 709/235 |
| 2013/0061127 A1* | 3/2013 | Reyes | G06F 16/958 715/234 |
| 2013/0094471 A1* | 4/2013 | Zhao | H04W 36/0011 370/331 |
| 2013/0094856 A1* | 4/2013 | Chen | H04J 14/0257 398/48 |
| 2013/0242983 A1* | 9/2013 | Tripathi | H04L 49/35 370/355 |
| 2013/0272256 A1* | 10/2013 | Mihaly | H04L 61/4511 370/329 |
| 2013/0304450 A1* | 11/2013 | Tsai | G06F 30/33 703/14 |
| 2014/0036873 A1* | 2/2014 | Cheng | H04W 36/0033 370/331 |
| 2014/0055467 A1* | 2/2014 | Bittner | G09G 5/363 345/520 |
| 2014/0098128 A1* | 4/2014 | Fein | G06T 19/006 345/633 |
| 2014/0098130 A1* | 4/2014 | Fein | G06T 19/006 345/633 |
| 2014/0098132 A1* | 4/2014 | Fein | G06T 19/006 345/633 |
| 2014/0101555 A1* | 4/2014 | Fein | G06F 3/013 715/733 |
| 2014/0109105 A1* | 4/2014 | Lee | H04L 63/1416 718/105 |
| 2014/0160941 A1* | 6/2014 | Hui | H04W 24/08 370/241 |
| 2014/0204102 A1* | 7/2014 | Rath | G06T 1/20 345/522 |
| 2014/0258446 A1* | 9/2014 | Bursell | H04L 41/0816 709/217 |
| 2014/0267271 A1* | 9/2014 | Billeter | G06T 15/005 345/426 |
| 2014/0267346 A1* | 9/2014 | Ren | G06T 15/04 345/582 |
| 2014/0267792 A1* | 9/2014 | Mullins | G06V 20/20 348/207.1 |
| 2014/0307617 A1* | 10/2014 | Laitila | H04W 28/02 370/312 |
| 2014/0364208 A1* | 12/2014 | Perry | A63F 13/31 463/31 |
| 2014/0364209 A1* | 12/2014 | Perry | G06F 3/04815 463/31 |
| 2014/0364212 A1* | 12/2014 | Osman | A63F 13/211 463/31 |
| 2015/0049095 A1* | 2/2015 | Nataros | G06T 1/20 345/505 |
| 2015/0049096 A1* | 2/2015 | Nataros | G06T 1/20 345/506 |
| 2015/0208356 A1* | 7/2015 | Niu | H04W 52/0261 455/574 |
| 2015/0213649 A1* | 7/2015 | Morishita | H04N 13/239 345/419 |
| 2015/0248783 A1* | 9/2015 | Fayle | H04W 4/029 345/633 |
| 2015/0288933 A1* | 10/2015 | Iversen | G06F 1/163 348/14.07 |
| 2015/0295787 A1* | 10/2015 | Kakadia | H04L 41/5035 370/236 |
| 2015/0312343 A1* | 10/2015 | Gunda | G06F 16/172 707/827 |
| 2016/0025982 A1* | 1/2016 | Sutherland | G02B 27/017 359/13 |
| 2016/0026242 A1* | 1/2016 | Burns | G06T 19/006 345/633 |
| 2016/0027215 A1* | 1/2016 | Burns | G06F 3/011 345/419 |
| 2016/0029190 A1* | 1/2016 | Rattner | H04B 5/0031 455/414.4 |
| 2016/0093108 A1* | 3/2016 | Mao | A63F 13/825 345/633 |
| 2016/0150421 A1* | 5/2016 | Li | H04L 41/0803 370/252 |
| 2016/0165484 A1* | 6/2016 | Cui | H04L 43/08 370/235 |
| 2016/0191412 A1* | 6/2016 | Min | H04L 41/083 709/226 |
| 2016/0285722 A1* | 9/2016 | Min | H04L 43/0876 |
| 2016/0342840 A1* | 11/2016 | Mullins | G06F 3/012 |
| 2016/0360970 A1* | 12/2016 | Tzvieli | A61B 5/6803 |
| 2017/0034749 A1* | 2/2017 | Chandramouli | H04W 36/0011 |
| 2017/0039613 A1* | 2/2017 | Kaehler | G06Q 30/0643 |
| 2017/0048876 A1* | 2/2017 | Mahindra | H04L 12/407 |
| 2017/0054658 A1* | 2/2017 | Min | G06F 9/45558 |
| 2017/0070435 A1* | 3/2017 | Marco | H04L 47/32 |
| 2017/0149626 A1* | 5/2017 | Yoon | H04W 4/029 |
| 2017/0180272 A1* | 6/2017 | Bernath | H04L 49/3054 |
| 2017/0201461 A1* | 7/2017 | Cheng | H04L 47/286 |
| 2017/0215011 A1* | 7/2017 | Goldstein | H04R 25/305 |
| 2017/0244777 A1* | 8/2017 | Ouyang | H04L 41/142 |
| 2017/0323449 A1* | 11/2017 | Aonuma | G06T 7/20 |
| 2017/0345215 A1* | 11/2017 | Khedkar | G06F 3/011 |
| 2017/0353496 A1* | 12/2017 | Pai | H04L 63/1441 |
| 2017/0358141 A1* | 12/2017 | Stafford | G02B 27/017 |
| 2017/0366951 A1* | 12/2017 | Kweon | G06F 3/011 |
| 2018/0004393 A1* | 1/2018 | Ens | G06F 3/04815 |
| 2018/0004693 A1* | 1/2018 | MacNamara | G06F 13/28 |
| 2018/0091447 A1* | 3/2018 | Jared | H04L 47/58 |
| 2018/0097775 A1* | 4/2018 | Obaidi | H04L 63/0236 |
| 2018/0098131 A1* | 4/2018 | Zhou | H04N 21/6373 |
| 2018/0103426 A1* | 4/2018 | Nacer | H04W 52/0209 |
| 2018/0139238 A1* | 5/2018 | Schultz | H04L 63/1491 |
| 2018/0139645 A1* | 5/2018 | Yu | H04L 47/621 |
| 2018/0144552 A1* | 5/2018 | Ishikawa | G06T 7/70 |
| 2018/0146189 A1* | 5/2018 | Park | H04N 13/344 |
| 2018/0157515 A1* | 6/2018 | Malloy | H04L 47/125 |
| 2018/0183855 A1* | 6/2018 | Sabella | H04W 52/0264 |
| 2018/0189568 A1* | 7/2018 | Powderly | G06T 19/006 |

(56) References Cited

U.S. PATENT DOCUMENTS

| | | | | |
|---|---|---|---|---|
| 2018/0191551 | A1* | 7/2018 | Chun | H04W 76/20 |
| 2018/0191632 | A1* | 7/2018 | Biederman | H04L 47/6275 |
| 2018/0191642 | A1* | 7/2018 | Biederman | H04L 47/6275 |
| 2018/0198824 | A1* | 7/2018 | Pulapaka | G06F 9/5077 |
| 2018/0241610 | A1* | 8/2018 | Wang | H04L 41/0897 |
| 2018/0249474 | A1* | 8/2018 | Chu | H04W 4/029 |
| 2018/0270126 | A1* | 9/2018 | Tapia | H04L 41/5009 |
| 2018/0277108 | A1* | 9/2018 | Badr | G06N 3/006 |
| 2018/0285549 | A1* | 10/2018 | Sonkar | G06Q 20/40145 |
| 2018/0288133 | A1* | 10/2018 | Colenbrander | H04L 67/01 |
| 2018/0293752 | A1* | 10/2018 | Ninan | G06F 3/011 |
| 2018/0308287 | A1* | 10/2018 | Daniels | G06T 19/20 |
| 2018/0316734 | A1* | 11/2018 | Nakabo | G06T 13/40 |
| 2018/0350145 | A1* | 12/2018 | Byl | G06F 3/017 |
| 2018/0359337 | A1* | 12/2018 | Kodaypak | H04L 41/0896 |
| 2018/0367570 | A1* | 12/2018 | Verma | H04W 12/06 |
| 2018/0375887 | A1* | 12/2018 | Dezent | H04L 41/142 |
| 2018/0375900 | A1* | 12/2018 | Verma | H04L 63/205 |
| 2019/0005733 | A1* | 1/2019 | Wehner | G06F 3/038 |
| 2019/0041651 | A1* | 2/2019 | Kiemele | G06F 3/011 |
| 2019/0041976 | A1* | 2/2019 | Veeramani | G06F 3/011 |
| 2019/0042297 | A1* | 2/2019 | Connor | H04L 43/20 |
| 2019/0042304 | A1* | 2/2019 | Wang | H04L 47/2441 |
| 2019/0042319 | A1* | 2/2019 | Sood | G06F 21/74 |
| 2019/0045034 | A1* | 2/2019 | Alam | H04L 67/303 |
| 2019/0053034 | A1* | 2/2019 | Kim | H04W 36/0022 |
| 2019/0058997 | A1* | 2/2019 | Futaki | H04W 76/27 |
| 2019/0079302 | A1* | 3/2019 | Ninan | G06F 1/1656 |
| 2019/0082057 | A1* | 3/2019 | Westberg | H04L 12/1403 |
| 2019/0113973 | A1* | 4/2019 | Coleman | A61B 5/165 |
| 2019/0114061 | A1* | 4/2019 | Daniels | G06F 3/04815 |
| 2019/0116505 | A1* | 4/2019 | Bhorkar | G06Q 50/01 |
| 2019/0130622 | A1* | 5/2019 | Hoover | G02B 27/0081 |
| 2019/0138934 | A1* | 5/2019 | Prakash | G06N 20/00 |
| 2019/0139296 | A1* | 5/2019 | Lakshman | G06T 15/08 |
| 2019/0139426 | A1* | 5/2019 | Kesavadas | G09B 19/00 |
| 2019/0140881 | A1* | 5/2019 | Akkarakaran | H04L 5/0048 |
| 2019/0140933 | A1* | 5/2019 | Guim Bernat | H04L 47/2408 |
| 2019/0141572 | A1* | 5/2019 | Zaks | H04W 12/106 |
| 2019/0149425 | A1* | 5/2019 | Larish | G06N 3/10 706/16 |
| 2019/0149997 | A1* | 5/2019 | Liao | H04W 12/122 455/411 |
| 2019/0156582 | A1* | 5/2019 | Yankovich | G06Q 30/0278 |
| 2019/0166106 | A1* | 5/2019 | Munro | H04L 9/3242 |
| 2019/0200243 | A1* | 6/2019 | Anand | H04L 41/40 |
| 2019/0212813 | A1* | 7/2019 | Yang | G06F 3/0304 |
| 2019/0237044 | A1* | 8/2019 | Day | G06F 3/147 |
| 2019/0304158 | A1* | 10/2019 | Dai | G06T 15/20 |
| 2019/0310479 | A1* | 10/2019 | Bak | G06F 3/012 |
| 2019/0310761 | A1* | 10/2019 | Agarawala | G06F 3/04817 |
| 2019/0313059 | A1* | 10/2019 | Agarawala | G06T 13/40 |
| 2019/0313144 | A1* | 10/2019 | Stokking | H04N 21/21805 |
| 2019/0313160 | A1* | 10/2019 | Stokking | H04N 21/26258 |
| 2019/0319858 | A1* | 10/2019 | Das | H04L 27/2637 |
| 2019/0325633 | A1* | 10/2019 | Miller, IV | G06K 9/00375 |
| 2019/0340200 | A1* | 11/2019 | Coimbra | G10L 13/02 |
| 2019/0340306 | A1* | 11/2019 | Harrison | G06N 3/08 |
| 2019/0349730 | A1* | 11/2019 | Kim | H04W 4/06 |
| 2019/0362151 | A1* | 11/2019 | Stokking | G06V 20/20 |
| 2019/0379671 | A1* | 12/2019 | Sundar | H04L 63/102 |
| 2019/0379992 | A1* | 12/2019 | Schmidt | H04R 1/1041 |
| 2019/0392643 | A1* | 12/2019 | Busto | G06F 3/011 |
| 2020/0007414 | A1* | 1/2020 | Smith | G06F 9/5072 |
| 2020/0008106 | A1* | 1/2020 | Huang-Fu | H04L 67/14 |
| 2020/0014486 | A1* | 1/2020 | Harrang | H04L 65/80 |
| 2020/0020166 | A1* | 1/2020 | Menard | G06F 3/011 |
| 2020/0029199 | A1* | 1/2020 | Sen | H04W 8/02 |
| 2020/0036955 | A1* | 1/2020 | Pesonen | H04N 13/111 |
| 2020/0045559 | A1* | 2/2020 | Kim | H04W 24/10 |
| 2020/0050788 | A1* | 2/2020 | Feuz | G06F 16/9537 |
| 2020/0051328 | A1* | 2/2020 | Mohan | G06T 19/006 |
| 2020/0051336 | A1* | 2/2020 | Ichikawa | G06T 19/006 |
| 2020/0053050 | A1* | 2/2020 | Malysh | H04L 63/0254 |
| 2020/0064997 | A1* | 2/2020 | Lewbel | G06F 40/169 |
| 2020/0067836 | A1* | 2/2020 | Tilli | H04L 45/7453 |
| 2020/0082389 | A1* | 3/2020 | Regev | H04L 9/50 |
| 2020/0082555 | A1* | 3/2020 | Iyer | G06T 7/579 |
| 2020/0084741 | A1* | 3/2020 | Chun | H04W 48/02 |
| 2020/0090407 | A1* | 3/2020 | Miranda | G02B 27/0093 |
| 2020/0098186 | A1* | 3/2020 | Xue | H04N 21/6587 |
| 2020/0099891 | A1* | 3/2020 | Valli | H04N 7/157 |
| 2020/0107003 | A1* | 4/2020 | Phillips | H04N 21/21805 |
| 2020/0127907 | A1* | 4/2020 | Koo | H04L 43/06 |
| 2020/0134298 | A1* | 4/2020 | Zavesky | H04N 7/157 |
| 2020/0147486 | A1* | 5/2020 | Bleasdale-Shepherd | A63F 13/35 |
| 2020/0152234 | A1* | 5/2020 | Sharma | G11B 20/00086 |
| 2020/0154449 | A1* | 5/2020 | Akkarakaran | H04L 5/0064 |
| 2020/0154499 | A1* | 5/2020 | Futaki | H04W 80/02 |
| 2020/0159570 | A1* | 5/2020 | Askeland | G06F 9/4843 |
| 2020/0178039 | A1* | 6/2020 | Lee | H04W 4/40 |
| 2020/0178048 | A1* | 6/2020 | Kim | H04W 12/062 |
| 2020/0178149 | A1* | 6/2020 | Seenappa | H04W 8/02 |
| 2020/0195828 | A1* | 6/2020 | Reyserhove | H04N 5/2353 |
| 2020/0196182 | A1* | 6/2020 | Nam | H04W 28/0263 |
| 2020/0225655 | A1* | 7/2020 | Cella | G05B 19/41875 |
| 2020/0226775 | A1* | 7/2020 | Tytgat | G06T 15/20 |
| 2020/0228602 | A1* | 7/2020 | Spoczynski | H04L 41/5054 |
| 2020/0236591 | A1* | 7/2020 | Yi | H04L 67/12 |
| 2020/0244297 | A1* | 7/2020 | Zalewski | H04B 1/3833 |
| 2020/0244547 | A1* | 7/2020 | Uppili | H04L 67/568 |
| 2020/0244557 | A1* | 7/2020 | Nie | H04L 43/0823 |
| 2020/0267518 | A1* | 8/2020 | Sabella | H04W 12/06 |
| 2020/0267729 | A1* | 8/2020 | Kim | H04W 72/0453 |
| 2020/0275306 | A1* | 8/2020 | Shah | H04L 45/304 |
| 2020/0276503 | A1* | 9/2020 | Marchiorello | A63F 13/798 |
| 2020/0295883 | A1* | 9/2020 | Lee | H04L 1/1887 |
| 2020/0296012 | A1* | 9/2020 | Paruchuri | H04L 43/0835 |
| 2020/0304996 | A1* | 9/2020 | Parekh | H04L 43/08 |
| 2020/0313977 | A1* | 10/2020 | Kapinos | H04L 41/147 |
| 2020/0320592 | A1* | 10/2020 | Soule | H04W 4/12 |
| 2020/0330869 | A1* | 10/2020 | Osman | A63F 13/211 |
| 2020/0336871 | A1* | 10/2020 | Baek | H04W 28/06 |
| 2020/0337107 | A1* | 10/2020 | Mildh | H04W 76/27 |
| 2020/0357299 | A1* | 11/2020 | Patel | A61B 5/11 |
| 2020/0359228 | A1* | 11/2020 | Sirotkin | H04L 5/003 |
| 2020/0382975 | A1* | 12/2020 | Jo | H04W 24/02 |
| 2020/0387537 | A1* | 12/2020 | Trim | H04N 1/603 |
| 2020/0396275 | A1* | 12/2020 | Zhu | H04L 67/131 |
| 2020/0404538 | A1* | 12/2020 | Zhu | H04W 28/0268 |
| 2021/0026521 | A1* | 1/2021 | Lee | G06T 19/20 |
| 2021/0029598 | A1* | 1/2021 | Wigard | H04W 36/0077 |
| 2021/0036887 | A1* | 2/2021 | Meng | H04L 12/66 |
| 2021/0037588 | A1* | 2/2021 | Zhu | H04W 48/18 |
| 2021/0045837 | A1* | 2/2021 | McGinley | A61B 90/36 |
| 2021/0049817 | A1* | 2/2021 | Lee | G06F 3/167 |
| 2021/0049818 | A1* | 2/2021 | Lee | H04W 4/029 |
| 2021/0084357 | A1* | 3/2021 | Tajik | H04N 21/42203 |
| 2021/0084429 | A1* | 3/2021 | Tajik | H04R 3/12 |
| 2021/0105308 | A1* | 4/2021 | Bouazizi | H04L 65/1016 |
| 2021/0110610 | A1* | 4/2021 | Xu | G06V 20/20 |
| 2021/0110646 | A1* | 4/2021 | Dixit | G06F 3/011 |
| 2021/0119941 | A1* | 4/2021 | Hoole | H04W 40/12 |
| 2021/0174189 | A1* | 6/2021 | Guven Kaya | G06N 3/08 |
| 2021/0176769 | A1* | 6/2021 | Chou | H04W 4/02 |
| 2021/0185363 | A1* | 6/2021 | Paiement | H04L 67/131 |
| 2021/0203777 | A1* | 7/2021 | Deng | H04M 3/4285 |
| 2021/0227363 | A1* | 7/2021 | Natwick | H04B 7/18506 |
| 2021/0243656 | A1* | 8/2021 | Paterson | H04W 88/085 |
| 2021/0259038 | A1* | 8/2021 | Paterson | H04L 5/0055 |
| 2021/0281664 | A1* | 9/2021 | Suryanarayanarao | H04M 15/66 |
| 2021/0306206 | A1* | 9/2021 | Bugenhagen | H04L 12/1868 |
| 2021/0321298 | A1* | 10/2021 | Keskitalo | H04W 28/08 |
| 2021/0321306 | A1* | 10/2021 | Bin Redhwan | H04W 36/0058 |
| 2021/0337576 | A1* | 10/2021 | Gaal | H04W 72/1284 |
| 2021/0344612 | A1* | 11/2021 | Files | H04L 41/147 |
| 2021/0345372 | A1* | 11/2021 | Li | H04W 72/1278 |
| 2021/0345383 | A1* | 11/2021 | Tesanovic | H04W 28/0278 |
| 2021/0352575 | A1* | 11/2021 | Chun | H04W 72/02 |
| 2021/0360102 | A1* | 11/2021 | Tan | H04M 3/42017 |
| 2021/0360390 | A1* | 11/2021 | Chun | H04W 8/24 |
| 2021/0360464 | A1* | 11/2021 | Zheng | H04W 52/0209 |

(56) References Cited

U.S. PATENT DOCUMENTS

| | | | |
|---|---|---|---|
| 2021/0368500 A1* | 11/2021 | Centonza | H04W 72/0426 |
| 2021/0377801 A1* | 12/2021 | Noriega | H04W 28/0284 |
| 2021/0377846 A1* | 12/2021 | Zhu | H04L 5/0053 |
| 2021/0385642 A1* | 12/2021 | Di Girolamo | H04W 8/18 |
| 2021/0385646 A1* | 12/2021 | Liu | H04W 28/06 |
| 2021/0385753 A1* | 12/2021 | Kontio | H04W 52/0229 |
| 2021/0392197 A1* | 12/2021 | Yang | H04L 67/55 |
| 2021/0392537 A1* | 12/2021 | Da Silva | H04W 76/25 |
| 2021/0392553 A1* | 12/2021 | Shi | H04W 36/0022 |
| 2021/0400765 A1* | 12/2021 | Bedekar | H04W 76/38 |
| 2021/0405736 A1* | 12/2021 | Zavesky | G06F 3/011 |
| 2021/0409316 A1* | 12/2021 | Seshan | G06K 9/6256 |
| 2021/0409317 A1* | 12/2021 | Seshan | G06K 9/627 |
| 2021/0409999 A1* | 12/2021 | Chilla | H04W 40/04 |
| 2021/0410210 A1* | 12/2021 | Lee | H04W 72/0453 |
| 2022/0007360 A1* | 1/2022 | MolavianJazi | H04W 72/10 |
| 2022/0014512 A1* | 1/2022 | Raleigh | H04L 63/20 |
| 2022/0014963 A1* | 1/2022 | Yeh | G06N 7/005 |
| 2022/0015143 A1* | 1/2022 | Tiirola | H04B 7/15 |
| 2022/0021426 A1* | 1/2022 | Piirainen | H04B 7/0413 |
| 2022/0021598 A1* | 1/2022 | Gupta | H04L 43/02 |
| 2022/0022090 A1* | 1/2022 | Schliwa-Bertling | H04L 41/0896 |
| 2022/0038897 A1* | 2/2022 | Liu | H04W 76/25 |
| 2022/0038946 A1* | 2/2022 | Kim | H04W 28/0284 |
| 2022/0038955 A1* | 2/2022 | Hande | H04L 43/0876 |
| 2022/0046652 A1* | 2/2022 | Yang | H04W 64/003 |
| 2022/0052936 A1* | 2/2022 | Chandrasekaran | H04L 43/065 |
| 2022/0086072 A1* | 3/2022 | Chou | H04L 41/5058 |
| 2022/0086218 A1* | 3/2022 | Sabella | H04W 4/00 |
| 2022/0086698 A1* | 3/2022 | Yao | H04L 43/20 |
| 2022/0086719 A1* | 3/2022 | Devlic | H04W 36/00837 |
| 2022/0095184 A1* | 3/2022 | Patil | H04W 36/0079 |
| 2022/0103614 A1* | 3/2022 | Ganguli | H04L 67/10 |
| 2022/0116462 A1* | 4/2022 | Cai | H04W 28/0925 |
| 2022/0124469 A1* | 4/2022 | Liao | H04L 67/34 |
| 2022/0124560 A1* | 4/2022 | Yeh | H04W 24/04 |
| 2022/0124844 A1* | 4/2022 | Boyapalle | H04W 76/12 |
| 2022/0140861 A1* | 5/2022 | Liu | H04L 5/0092 370/228 |
| 2022/0150747 A1* | 5/2022 | Tsuda | H04N 21/43637 |

* cited by examiner

IMMERSIVE REALITY COMPONENT MANAGEMENT VIA A REDUCED COMPETITION CORE NETWORK COMPONENT

TECHNICAL FIELD

The disclosed subject matter relates to management of immersive reality devices via a reduced competition core network component(s). More specifically, use of immersive reality devices such as augmented reality, virtual reality, mixed reality, etc., devices, can be supported via a reduced competition core network component(s), more especially where the reduced competition core network component(s) are implemented in user-plane/control-plane schemas, that can facilitate provision of a service(s), application(s), validation process(es), access to local/remote data, etc., in a fixed or mobile environment and over a wired or wireless connection(s), for example, a 5G (5th Generation) wireless network or other next generation network.

BACKGROUND

Conventionally an augmented reality, virtual reality, or mixed reality device can typically comprise computing/power resources that can add bulk and weight to the device, causing the device to be unwieldy to perform daily activities in, hot to wear, tiring to use, etc. Further, such a conventional device can have limited access to data where it is not connected to a wireless network, e.g., where the device is connected just to local resources, etc. Additionally, where a conventional device is connected to a wired or wireless network, the conventional device can be forced to compete with other devices connected to the wired or wireless network; for example, where an augmented reality, virtual reality, or mixed reality device, etc., is connected to a wireless carrier network, the augmented reality, virtual reality, or mixed reality device can be forced to compete with phones, tablet computers, laptop computers, internet or things (IoT) devices, etc., that can all be vying for network resources. Given the computing demands of an augmented reality, virtual reality, or mixed reality device, the competition via conventional enhanced packet core, evolved packet core, 5G core, etc. (any of these being referred to hereinafter, including in the claims, as "evolved packet core" or "EPC") components can significantly impact the performance of the augmented reality, virtual reality, or mixed reality device. Moreover, the security and authentication services provided by conventional EPC components can be insufficient for the types of information, services, applications, etc., employed on the augmented reality, virtual reality, or mixed reality device. It is desirable to improve the performance, security, and design of an augmented reality, virtual reality, or mixed reality device by improving networks, more especially modern wireless carrier networks, to support the heightened computing demands of the augmented reality, virtual reality, or mixed reality device.

DETAILED DESCRIPTION

Figure 1:
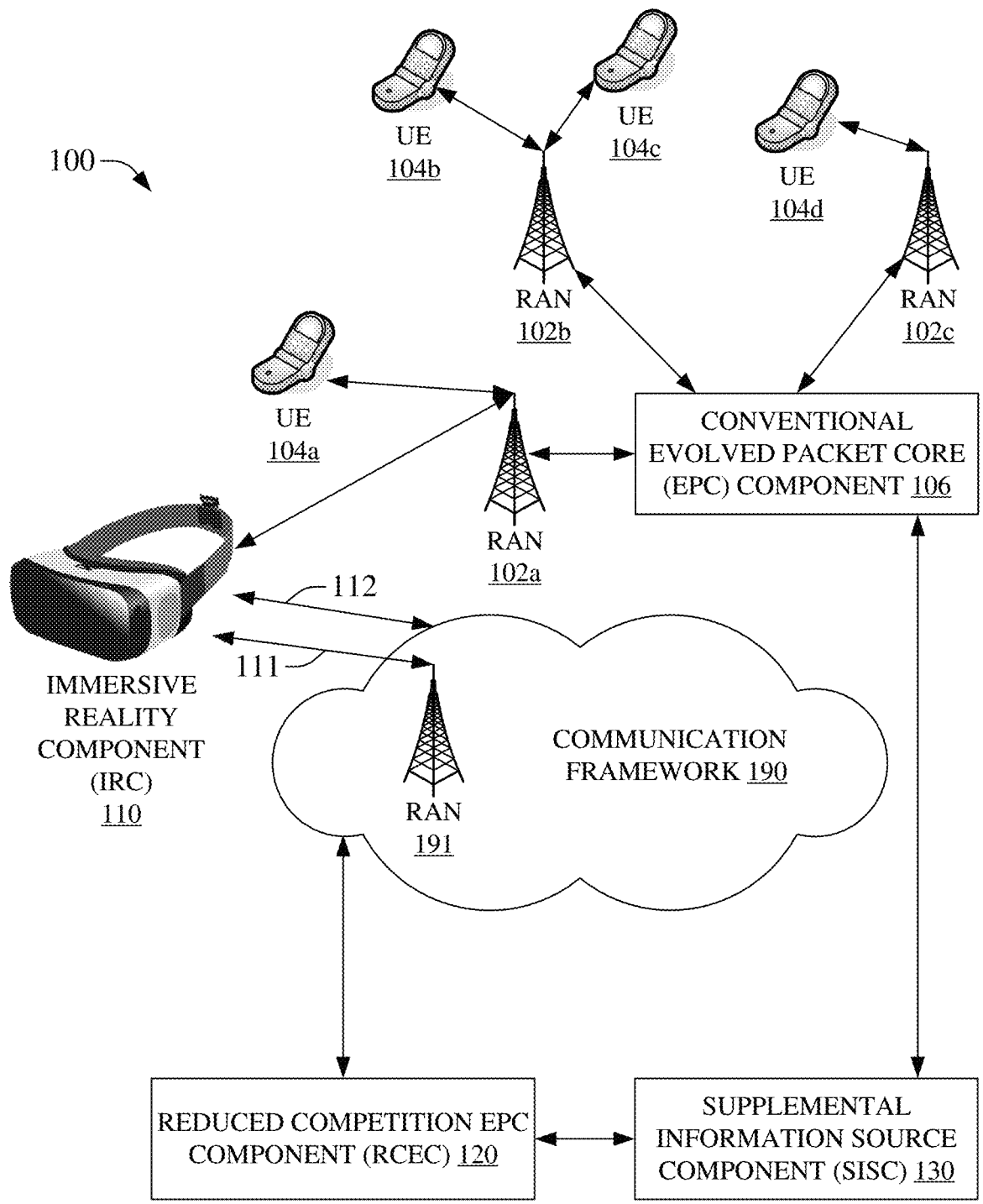
FIG. 1 is an illustration of an example system that can facilitate management of an immersive reality component via a reduced competition evolved packet core component, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As is noted herein, a conventional augmented reality, virtual reality, mixed reality, etc., device, hereinafter an immersive reality (IR) device (IRD), immersive reality component (IRC), etc., can be bulky and heavy due to comprising a high level of computing power and a correspondingly significant power source. The bulk and weight of an immersive reality device can result in the IRD/IRC being unwieldy in typical use applications, generating a high level of heat, being physically demanding to a user, etc. Conventional IRD/IRC can also suffer performance degradation by competing with other devices, e.g., phones, computers, IoT devices, etc., for network resources. Further, authentication and security for an IRD/IRC may not be well supported in networks that have been historically developed for other devices, e.g., phones, computers, IoT devices, etc. As such, the presently disclosed subject matter can provide for the improvement of performance, security, and engineering/ design of an IRD/IRC, e.g., by providing a network component(s), more especially a modern wireless carrier network component(s), to support the heightened computing demands of the augmented reality, virtual reality, mixed reality device, etc.

In an aspect, an IRD/IRC, hereinafter just termed IRC for brevity, can offload computing resources from the IRC to a network component, e.g., the IRC can become 'thinner' by shifting computation of images, sounds, etc., from a wearable device to a network device. This 'thinner IRC' can additionally result in reduced power consumption because the power consumed in computing an image, a sound, etc., can be consumed, for example, on a network component, etc., instead of a wearable device. A 'thinner IRC' can therefore weigh less, be less bulky, generate less heat load, consume less power, etc., resulting in an IRC that can be more comfortable to wear, use, etc.

However, in a conventional carrier network, core network components can typically be designed for use with other types of devices, such as phones, tablets, laptops, IoT devices, etc. Further, IRC computing demands can be significantly higher than that of the other devices. Accordingly, simply dumping IRDs/IRCs onto current EPC components in a typical wireless carrier network can result in high competition for computing resources, which can result in insufficient IRD/IRC performance. The disclosed subject matter envisions deploying reduced competition EPC components (RCECs) in a carrier network to provide IRC support that is designed to better support an IRC than a crowded conventional EPC component. In some embodiments, an RCEC can be explicitly dedicated to supporting an IRC, e.g., the RCEC can be exclusive of any support for a phone, tablet, laptop, IoT, etc., device. In some embodiments, a RCEC can preferentially support an IRC, but can provide support for other types of devices, e.g., where the RCEC has unused capacity, that unused capacity can be allocated to support other types of devices, though generally where IRC demand increases, e.g., resulting in less unused capacity at the RCEC, the support of other types of devices can be reduced to allow the RCEC to preferentially support IRCs, e.g., where IRC demand increases for a RCEC, phone support can be pushed from the RCEC back to a conventional EPC component so that the IRC(s) face less competition for the RCEC resources.

Further, RCECs can be implemented in a control-plane/user-plane scheme that can move RCEC resources closer to an IRC, which can result in moving less information over a wired/wireless carrier network. As an example, an enterprise entity can have a user-plane (UP) RCEC (UPR) that can support an IRC by providing computing resources, access to local and/or remotely located data, etc. Continuing this example, the UPR can communicate with a control-plane (CP) RCEC (CPR) that can be implemented at a carrier network component, e.g., via a core-network component of a wireless carrier network, etc. Accordingly, the UPR and CPR can facilitate access to computing resources, local/remote data, etc., on the enterprise side, e.g., via the UPR, access to other computing resources, other local/remote data, etc., on the carrier network side, e.g., via the CPR, access to further computing resources, further local/remote data, etc., on other local/remote enterprise components, e.g., via the CPR to another local/remote UPR, access to different computing resources, different local/remote data, etc., on the enterprise side, e.g., via another hierarchical level of UPR, etc.

Additionally, authentication and security can be implemented via a RCEC, including via one or more UPR/CPR schema. The implementation of authentication and security via a RCEC can allow for authentication and security specific to the demands of IRC type devices, components, data, etc., more especially as directed via an entity such as a company, corporation, or other enterprise-type entity. This can be in contrast to the comparatively tightly controlled authentication and security of a conventional EPC component. As an example, a wireless carrier will not typically allow a client corporation access to, modification of, etc., carrier authentication and security, e.g., AT&T WIRELESS (AT&T) is unlikely to allow BOEING to look at or change the authentication/security systems AT&T uses to authenticate and provide security to devices of AT&T customers simply to enable BOEING to provide authentication and security to IRC devices that BOEING may employ in their facilities. However, where RCEC technology is employed, authentication and security of conventional devices of AT&T customers can be separated, e.g., performed via conventional EPC component(s), from a RCEC provided for BOEING IRC(s), whereby AT&T can enable BOEING to access, manipulate, etc., authentication and security component(s) in the provided RCEC.

In an aspect, a RCEC can interact, communicate, etc., with conventional EPC component(s) of a carrier network. As such, services, applications, information, etc., of the conventional EPC can be made available to IRC(s) from the EPC via a RCEC. As an example, an EPC can already have a location service component, whereby location based services can be provided to an IRC by a connection to the location service component via an RCEC. Similarly, for example, access to voice services, billing services, data services, location services, traffic services, weather services, etc., can be provided via connections between the corresponding EPC service component and a RCEC.

In another aspect, 5G wireless communication is expected to provide every user equipment (UE), e.g., every phone, computer, IoT device, etc., in addition to every IRD/IRC, with a directed and focused beam of radio energy, in contrast to previous technologies that generally provided broader coverage of multiple UEs in a larger region, e.g., service provided to all devices in a 120-degree sector of a cell site. This maturation of wireless network technologies can result in many individual beams each serving a corresponding UE. As an example, where a region of a wireless network covers 1000 UEs, the base stations can provide 1000 distinct beams of radio energy, which can require computing timing delay, phase shifting, amplitude adjustments, etc., to many radiative elements of an antenna to provide the 1000 beams, and can further require altering these computations to reduce inference associated with the 1000 beams. Additionally, in this example, there can be further computations related to multiplexing, in time, frequency, etc., related to effectively providing communication for the 1000 devices via the 1000 beams. When performed properly, the 5G-type wireless network technology can provide fast and reliable wireless service. However, the computations can be complex and result in unique beams that may each undergo different handover event environments. As such, it can be desirable to apportion computing to reduce network resource demands and to allocate network components into different classes of performance, e.g., moving the types of information associated with conventional voice, data, IoT, etc., devices can be distinct from moving the types of data associated with a high-demand component, e.g., an IRD/IRC, etc. Implementing a reduced competition EPC component (RCEC) can enable better separation of conventional information movement from high-demand information movement, which can then be leveraged in a 5G or other modern wireless network to better move the different types of information to/from their respective device(s).

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate management of an immersive reality component via a reduced competition evolved packet core component, in accordance with aspects of the subject disclosure. System 100 can comprise radio access network (RAN) nodes 102a, 102b, 102c, 191, etc. A RAN node can enable connection to a wireless network, e.g., UEs 104a-d, etc., can connect to a wireless network via RANs 102a-c, etc., immersive reality component (IRC) 110 can be connected to a wireless network via RAN 191, etc., and other devices can connect to a wireless network via other RAN nodes not illustrated for the sake of clarity and brevity. In an aspect, IRC 110 can connect to a wireless network via one or more of RAN 102a-c, etc. Further, one or more RAN nodes, e.g., RAN 102a-c, 191, etc., can be included in a communication framework, e.g., communication framework 190, etc. Moreover, RAN nodes, e.g., RAN 102a-c, etc., can be connected to a conventional evolved packet core (EPC) component 106 that can be included in a wireless network, e.g., as part of a core-network of a wireless carrier network, etc.

In an embodiment, communication framework 190 can enable access to a reduced competition EPC component (RCEC), e.g., RCEC 120, etc. In an aspect, RCEC 120, etc., can facilitate connecting IRC 110, etc., to a wireless network separate from connection to the wireless network via conventional EPC component 106, etc. Accordingly, RCEC 120 can be regarded as being dedicated to enabling a network connection for IRC 110, etc. However, in some embodiments, RCEC 120 can be regarded as preferentially enabling a network connection for IRC 110, etc. In an aspect, where RCEC 120 is dedicated to enabling a network connection for IRC 110, RCEC 120 can be restricted from enabling a network connection to non-IRCs, etc. Where RCEC 120 preferentially enables a network connection for IRC 110, RCEC 120 can enable a network connection to non-IRCs less preferentially than enabling a network connection to IRC 110, e.g., where RCEC 120 has unused capacity, RCEC 120 can be employed to enable support of a conventional device, though where demand from IRCs rises, conventional devices can be pushed off of RCEC 120 such that IRC 110 experiences less competition for network services, applications, data, etc., provided via a connection to the network. In an aspect, IRC 110 can employ a wired connection, e.g., wired connection 112, or wireless connection, e.g., wireless connection 111, via communication framework 190 to a network, e.g., via RCEC 120, etc.

IRC 110 can access information facilitating providing an immersive reality experience, e.g., augmented reality, virtual reality, mixed reality, etc., at IRC 110, via supplemental information source component (SISC) 130. In an aspect, RCEC 120 can perform at least some of the computation related to presenting an immersive reality experience via IRC 110, and the computation can be based, in part, on information accessed via SISC 130. As an example, where IRC 110 indicates to RCEC 120 that a user is viewing a wiring harness, RCEC 120 can gather location data, wiring harness information, and procedural instruction information from one or more data/information sources via SISC 130. Continuing this example, the information gathered from SISC 130 can be employed by RCEC 120 to generate an immersive reality package that can be returned to IRC 110, wherein the immersive reality package, for example, can provide imagery and audio instructions for repairing the wiring harness based on, for example, determining that IRC 110 is viewing a BOEING 787 wiring harness at the Everett, Wash. assembly plant, determining that damage to the wiring harness has occurred, and determining which repair procedure should be performed, for example, based on an image of the damage, user input indicated via IRC 110, designated FAA approved repair procedure information, etc. In an aspect, sensor data from IRC 110, comprising user input, imagery, audio, temperature, time, orientation/direction/position, movement, bio-feedback, or nearly any other sensor information, can be received at RCEC 120, processed, and employed in gathering information from nearly any source via SISC 130. Moreover, the gathered information can then be employed by RCEC 120 to provide data back to IRC 110, e.g., an immersive reality package, that can be sent whole or in parts, which can facilitate providing an immersive reality experience to a user of IRC 110. The immersive reality experience can comprise one or more of an audio event, an imagery event, a haptic event, an olfactory event, a taste event, or nearly any other type of interaction with a user. In an aspect, an augmented reality experience, a virtual reality experience, a mixed reality experience, etc., can be regarded as an immersive reality experience.

In an aspect, RCEC 120 can facilitate a 'thinner' IRC, e.g., IRC 110 can be 'thinner' than an IRC that does not interact with an RCEC. IRC 110 can be thinner, for example, because RCEC 120 can provide computational resources facilitating determining an immersive reality experience. Moreover, RCEC 120 can generally provide computational resources for IRC 110 with less competition than is typical of IRC 110 employing conventional EPC component 106, which can similarly allow IRC 110 to be thinner than in a more conventional technology. A thinner IRC can be more user friendly, e.g., lighter, smaller, cooler, longer battery life for a given battery, than would generally be experience with a thicker IRC, e.g., a thinner IRC can have less computer hardware than a thicker IRC, resulting in the thinner IRC typically being lighter, cooler, more power efficient, etc.

In some embodiments, RCEC 120 can enable authentication of IRC 110. In an aspect, where RCEC 120 also provides service to conventional UEs, RCEC 120 can further provide authentication of these conventional UEs. In some embodiments, authentication, security, etc. can be retained by a carrier network. In other embodiments, an authentication service, a security service, etc., enabled by RCEC 120 can be modified by entities other than a network entity of a carrier network, e.g., a corporate entity can be permitted to provide an authentication service, a security service, etc., corresponding to an IRC affiliated with the corporate entity. As an example, the Port Authority of New York can employ IRCs for their cargo container crane operators and, accordingly for example, RCEC 120 can be provisioned with an authentication protocol(s) so that only designated IRCs associated with the Port Authority can access RCEC 120, can be provisioned with a security protocol(s) so that some information, such as manifests, crane operator names, freight destination addresses, etc., can be encoded when communicated, for example between SISC 130 and RCEC 120, between RCEC 120 and IRC 110, etc., or nearly any other authentication, security, etc., measure can be implemented via RCEC 120, IRC 110, SISC 130, etc.

In some embodiments, RCEC 120 can be implemented in hardware or in hardware and software. In some embodiments, RCEC 120 can be an instance of a virtual network function (VNF). Accordingly, one or more instances of RCEC 120 can be readily implemented, for example, a VNF RCEC 120 can be instantiated based on demand for RCEC performance, etc. In some embodiments, orchestration products, such as Kubernetes, can be used to implement UPRs and/or CPRs in a working orchestration node. In some embodiments, VNF IRCs can be supported on dynamically allocated computing resource platforms, e.g., "cloud" platforms such as MICROSOFT AZURE, AMAZON WEB SERVICES, etc. In an aspect, an instance of an RCEC can be caused for a region, a location, a client, a subscriber, based on demand, based on performance, based on a historical demand/use pattern or prediction, by a type of use, etc. As an example, an instance of an RCEC can be caused for the state of South Dakota, for the city of Denver, for the Port of Los Angeles, for Boeing, for a specific Boeing manufacturing facility, for O'Hare Airport, etc., such that the RCEC instance can be tailored to operate with particular performance characteristics for that instance, e.g., the needed computer resources for an over-the-road trucking company RCEC instance can be substantially different from the computer resources needed by an air traffic controller RCEC instance and, accordingly, the deployed instances of these two example RCECs can be different, e.g., different numbers of operations per second, different reserved memory/storage space, different connected services/applications, etc. In the over-the-road trucking RCEC example, there may be countrywide map services, countrywide location services, inventory services, etc., but relatively slower processors and slower network connections than for the example air traffic controller RCEC that can be allocated faster processors because planes typically move faster than trucks, faster network connections because real time information for airplanes can be more desirable than a slight lag in providing information about construction on a freeway to a trucker, but smaller map and location service footprints because the air traffic control can be limited to a smaller region than an over-the-road trucking company service area.

Figure 2:
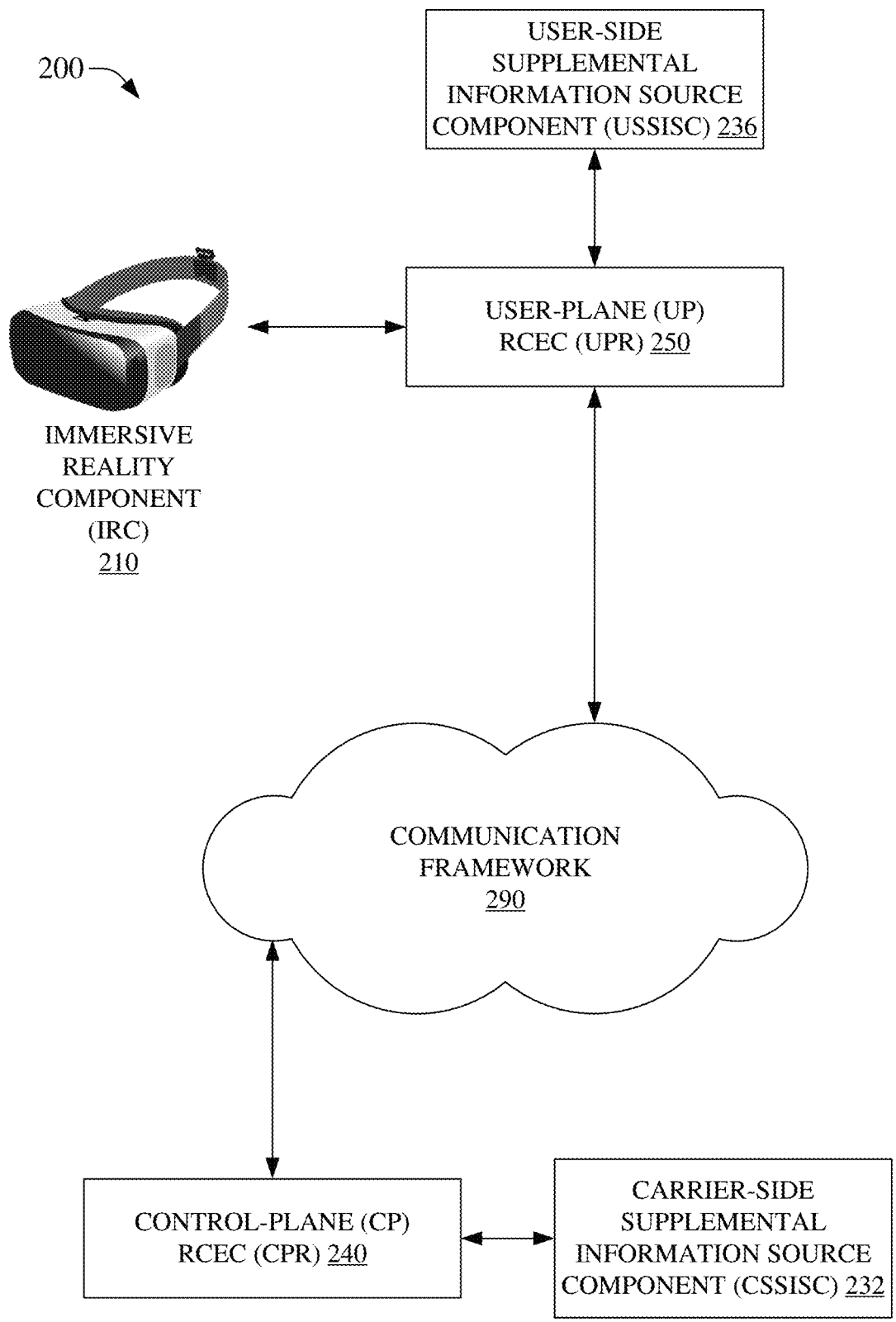
FIG. 2 is an illustration of an example system that can facilitate management of an immersive reality component via a user-plane reduced competition evolved packet core component and a control-plane reduced competition evolved packet core component, in accordance with aspects of the subject disclosure.

FIG. 2 is an illustration of a system 200, which can enable management of an immersive reality component via a user-plane reduced competition evolved packet core component and a control-plane reduced competition evolved packet core component, in accordance with aspects of the subject disclosure. System 200 can split an RCEC into a user-plane (UP) and control-plane (CP) scheme. As such, system 200 can comprise UP RCEC (UPR) 250 that can communicate with IRC 210. In an aspect, UPR 250 can provide computing resources to facilitate determining an immersive reality experience that can be presented to a user via IRC 210, as is disclosed elsewhere herein. It is noted that in some embodiments, UPR 250 can be employed without further connection to a carrier network, e.g., UPR 250 can interact with IRC 210 to facilitate determining and/or presenting an immersive reality experience, for example, by receiving sensor information from IRC 210, gathering supplemental information from a user-side supplemental information source, e.g., via user-side supplemental information source component (USSISC) 236, and determining a immersive reality experience package that can be returned to IRC 210. However, these embodiments can be limited by enterprise resources, network breadth, etc., and system 200 can, in many embodiments, further comprise CP RCEC (CPR) 240 that can communicate with UPR 250 to provide further computing resources and/or access to information via carrier-side supplemental information source component (CS-SISC) 232 to support IRC 210.

In an embodiment, CSSISC 232 can be the same as or similar to SISC 130. Accordingly, CSSISC 232 can enable access to information that is stored local to the carrier core network, stored remotely from the carrier core network, or is accessible via connection to the carrier network. The can be compared to USSISC 236 typically enabling access to information that is stored local to an enterprise network or that is stored remotely from the enterprise network but is accessible via connection to the enterprise network. In an example, a FEDERAL EXPRESS (FEDEX) UPR 250 can access cargo van, cargo plane, and cargo truck data via USSISC 236 from a data store at a FEDEX data center to facilitate presenting an immersive experience to a route planning executive via IRC 210, however, UPR 250 can interact with CPR 240 via communication framework 290, to gather traffic data, location data, weather data, etc., via CSSISC 232 where those information services can be readily accessed via existing carrier network components.

In an aspect, UPR 250 and CPR 240 can each provide some computing resources to facilitate presentation of an immersive reality experience to a user of IRC 210. In addition to processing data from different data sources, e.g., UPR 250 typically processing information gathered via USSISC 236 and CPR 240 typically processing information gathered via CSSISC 232, splitting an RCEC into a UP and CP scheme can provide other benefits. As an example, UPR 250 can be performed on enterprise equipment, e.g., UPR 250 can be a hardware/software device located at an enterprise facility. In an aspect, some enterprises can have more limited computing resources than a carrier. As such, UPR 250 can be limited, for example, in how many IRCs it can support, how advanced the immersive reality experience presented is, etc. Accordingly, additional computer resources can be made available via CPR 240. In an aspect, CPR 240 computer resources can be considerable for a larger carrier entity, in some cases more extensive than can be provided by enterprise level customer of the carrier entity.

Additionally, CPR 240 can be implemented on scalable computing resources at a more cost-effective level than might be possible for some enterprise level entities; for example, where a national carrier may provide far more RCEC instances that a single enterprise level client entity, the national carrier may get preferable rates for cloud computing resources. Accordingly, dividing access to computing resources between UPR 250 and CPR 240 can be beneficial, more especially where the distribution of processing tasks is adjustable, increased flexibility can be provided to clients. As an example, a single farmer of corn in Iowa can employ IRC 210 and provide a server that executes an instance of UPR 250 to support IRC 210 and that stores historical harvest data for this one farm and a map of the same farm, which can each be accessed via an instance of USSISC 236 executing on the same server. As can be appreciated in this example, the farmer's server can be substantially less powerful than available servers of a corporate entity such as AT&T, the farmer's server can have more limited access to other supplemental information and/or supplemental information than may be available via an AT&T server, etc. As such, the farmer's UPR 250 can be communicatively coupled, via communication framework 290, to CPR 240 to provide additional computer resources and data access. Moreover, CPR 240 can provide redundancy, e.g., where UPR 250 experiences some hardware failure, software glitch, etc., CPR 240 can readily be scaled to compensate. However, it will be noted that where UPR 250 is sufficient, less data will need to be communicated via communication framework 290 by scaling back the role of CPR 240.

Figure 3:
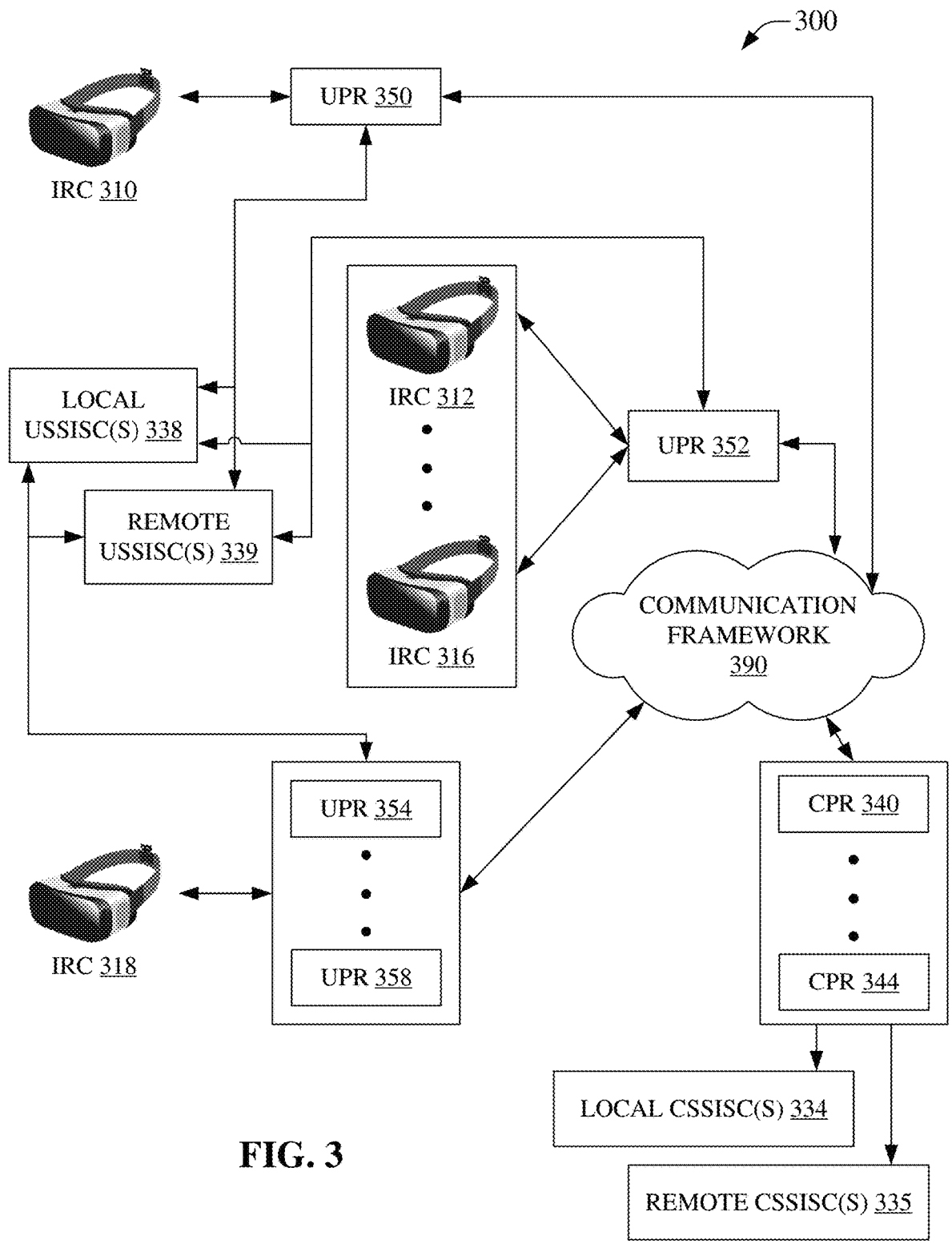
FIG. 3 is an illustration of an example system that can enable management of an immersive reality component via a user-plane reduced competition evolved packet core component scheme, in accordance with aspects of the subject disclosure.

FIG. 3 is an illustration of a system 300, facilitating management of an immersive reality component via a user-plane reduced competition evolved packet core component scheme, in accordance with aspects of the subject disclosure. System 300 can comprise IRCs, e.g., IRC 310, 312-316, 318, etc., which can be communicatively coupled to UPRs, e.g., UPR 350, 352, 354-358, etc. The UPRs can provide computing resources to the respective IRCs to enable determining a corresponding immersive reality experience that can be presented to users via the IRCs, as is disclosed elsewhere herein. The UPRs can gather supplemental information from local USSISC(s) 338, remote USSISC(s) 339, or combinations thereof. In an aspect, local USSISC(s) 338 can be located local to the UPRs, for example in computing facility, on a local wired network, etc. In a further aspect, remote USSISC(s) 339 can be located remotely from the UPRs. As an example, UPR 350 can be instantiated at a BOEING facility in Renton Wash., while remote USSISC(s) 339 can be instantiated at another BOEING facility located in Everett Wash.

In an aspect, UPRs can have different relationships with IRCs, e.g., a 1:1 relationship, an N:1 relationship, a 1:M relationship, an N:M relationship, etc. System 300 illustrates some of these relationships to aid in understanding the disclosed subject matter. IRC 310 can be regarded as having a 1:1 relationship with UPR 350, e.g., UPR 350 only interacts with IRC 310 to facilitate an immersive reality experience to a user of IRC 310. IRCs 312 to 316 can be regarded as having an N:1 relationship with UPR 352, e.g., UPR 352 interacts with each of IRCs 312 to 316 to facilitate an immersive reality experience to users of each of IRCs 312 to 316. IRC 318 can be regarded as having a 1:M relationship with UPRs 354 to 358, e.g., one or more of UPRs 354 to 358 can operate jointly to interact with IRC 318 to facilitate an immersive reality experience to a user of IRC 318.

UPRs 350 to 358 can be communicatively coupled, via communication framework 390, to one or more CPRs, e.g., CPRs 340 to 344, etc. Similar to system 200, a CPR can provide carrier-side computation and information access, e.g., via local CSSISC(s) 334, remote CSSISC(s) 335, or combinations thereof. Moreover, more than one CPR instance can operate jointly to provide additional computing resources and/or data access to one or more UPRs. As an example, UPR 350 can be coupled to CPR 340. In another example, UPR 350 can be coupled to CPR 340 to 344 that can be operating jointly. As an alternative, in scalable CPRs, rather than jointly operating instances of a CPR, the resources of a CPR can be scaled according to the need of a corresponding UPR and IRC, e.g., rather than using two instances of CPRs, a single instance of a CPR can be scaled to have double the computer resources in some embodiments. In further example, UPRs 354 to 358 can be coupled to one or more of CPRs 340 to 344 to facilitate determining an immersive reality experience package for IRC 318.

The flexibility of the relationships between IRCs and UPRs and between UPRs and CPRs can provide great flexibility in the deployment of the disclosed subject matter. As an example, a moderate farming concern can operate a single UPR and can start with one IRC but can expand to additional IRCs at a later date and, moreover, can employ one or more CPRs, e.g., in a scalable manner, on the carrier-side. As a second example, a large airplane manufacturing enterprise can deploy a huge number of IRCs and can have powerful local computing resources that can enable deployment of an equal number of UPRs such that they can achieve a 1:1 relationship between IRCs and UPRs and, moreover, where they may already have extensive computing resources and need relatively limited access to supplemental information from the carrier side, can employ relatively few CPRs in comparison to the number of UPRs instantiated. As a third example, a drone delivery company that uses IRCs to aid human pilots to fly parts of the drone missions can deploy a moderate number of IRCs but can rely more heavily on carrier side computing resources and have relatively few UPRs, which can result in an N:M relationship of IRC to UPRs, but can have a large number of CPRs in service. Numerous other examples are readily appreciated by one of skill in the art, all of such examples are considered within the scope of the disclosed subject matter even where not explicitly recited for the sake of clarity and brevity.

Figure 4:
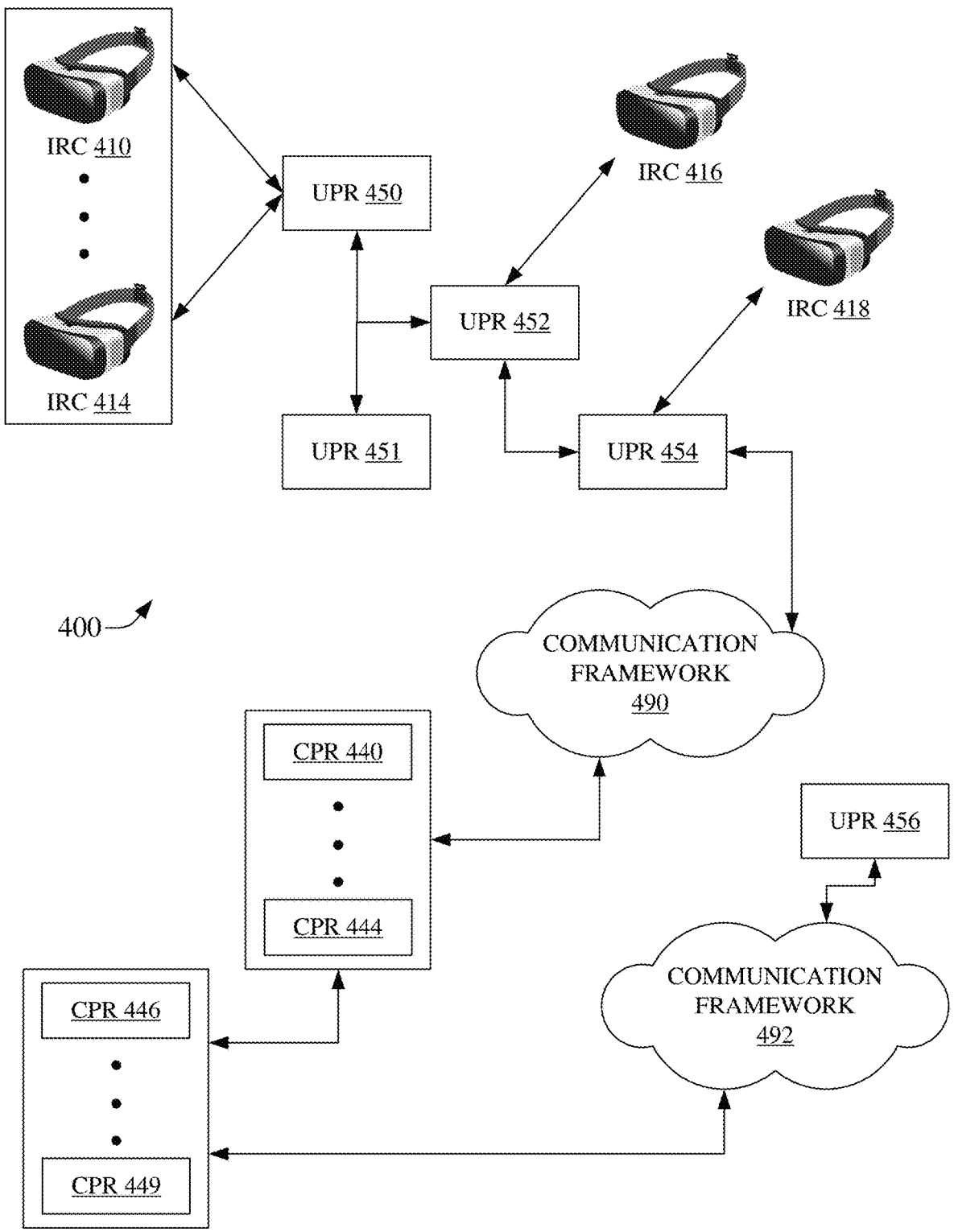
FIG. 4 illustrates an example system that can facilitate management of an immersive reality component via a hierarchical user-plane reduced competition evolved packet core component, in accordance with aspects of the subject disclosure.

FIG. 4 is an illustration of a system 400, which can enable management of an immersive reality component via a hierarchical user-plane reduced competition evolved packet core component, in accordance with aspects of the subject disclosure. System 400 can comprise one or more IRCs, e.g., IRC 410 to 414, 416, 418, etc. IRCs can be connected to one or more hierarchical levels of UPRs, for example first level UPR 450, 451, etc., second level UPR 452, etc., third level UPR 454, etc., or some other level of UPR. In an aspect, UPRs can be connected in a hierarchical level to provide access to additional user-side computing resources. In an embodiment, additional computing resources can operate in a joint pool, e.g., any of UPR 450, 451, 452, 454, 456, etc. can perform any indicated computing task for any of IRC 410-414, 416, or 418. In another embodiment, the hierarchical tiers of UPRs can restrict access to the additional computing resources based on one or more hierarchical rules. As an example, a first hierarchical rule can allow use of additional computing resources from higher level tiers only where that tier is not in use by an IRC attached to that tier, e.g., IRC 410-414 cannot use the additional computing power of UPR 452 if IRC 416 is connected to UPR 452 and cannot use the additional computing power of UPR 454 if IRC 418 is connected to UPR 454. As another example, a second hierarchical rule can allow use of additional computing resources from higher level tiers up to encountering a tier in use, e.g., even if IRC 418 is not connected to UPR 454 (not illustrated), IRC 410-414 cannot use the additional computing power of UPR 452 if IRC 416 is connected to UPR 452 and also cannot use the additional computing power of UPR 454 if IRC 416 is connected to UPR 452. Numerous other hierarchical rules are readily appreciated by one of skill in the art and are to be considered within the scope of the instant disclosure even where not explicitly recited for clarity and brevity.

System 400 further illustrates that CPRs can similarly be organized in hierarchical levels that can also be controlled based on hierarchical rules. Hierarchically arranged UPRs can be communicatively coupled to CPRs, which can comprise hierarchically arranged CPRs, via a communication framework, e.g., communication framework 490, 492, etc.

In an aspect, hierarchical arrangement of RCECs, e.g., UPRs and CPRs can facilitate tiered access to applications, services, etc. As an example, a service offered on UPR 454 may not be available to lower level tiers, e.g., UPRs 450, 451, 452, etc. Similarly, applications available via CPR 446 may be available to UPR 456 but may not be available to UPRs 450-454 connected to CPRs 440-444 via communication framework 490. In another aspect, hierarchical arrangement of UPRs and CPRs can facilitate preferential access to applications, services, etc. As an example, a service offered on UPR 454 may only be available to lower level tiers, e.g., UPRs 450, 451, 452, etc., where it is not in use by IRC 418, this aspect can be reflected in tiered CPRs as well. It will be noted that communication framework 490, 492, etc., can be the same or different communication frameworks and are illustrated separately in system 400 simply for convenience. Additionally, it is noted that the tiers of UPRs and CPRs can relate to locations of, communication links between, cost of access to, etc., RCECs. As an example, UPR 450 can be located at a first enterprise location and UPR 452 can be located at a second enterprise location wherein use of UPR 452 by IRC 410 can incur additional network resource costs, e.g., extra time, extra monetary cost, increase in network traffic, etc., whereby it can be preferential to have IRC 410 employ UPR 450 and/or 451 up to a threshold level before permitting use of UPR 452. Moreover, although not illustrated, in some embodiments, one or more tiers can be connected to communication framework 490, 492, etc., e.g., UPR 450 can be connected to CPR 440 by communication framework 490, which is not illustrated for the sake of clarity, such that where use of a higher tier, e.g., UPR 452 is not indicated, UPR 450 can still communicate to CPR 440.

Figure 5:
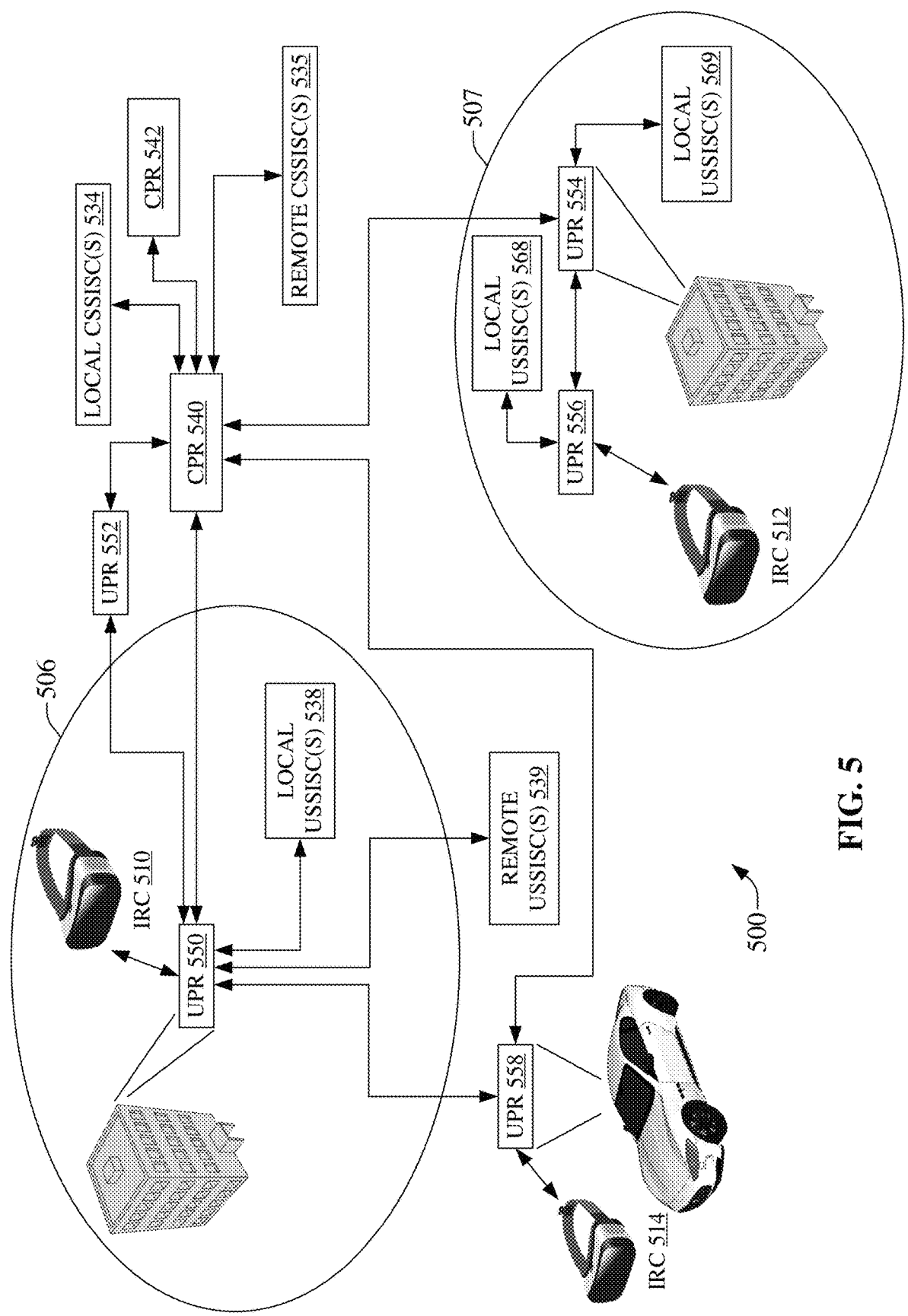
FIG. 5 is an illustration of an example system supporting management of an immersive reality component via reduced competition evolved packet core components of different entities, in accordance with aspects of the subject disclosure.

FIG. 5 is an illustration of a system 500, which can facilitate management of an immersive reality component via reduced competition evolved packet core components of different entities, in accordance with aspects of the subject disclosure. System 500 can comprise IRCs, e.g., IRC 510, 512, 514, etc. that can be connected to UPRs, e.g., UPR 550, 552, 554, 556, 558, etc. In an example embodiment, enterprise facility 506 can comprise UPR 550 and can provide access to local USSISC(s) 538 and/or remote USSISC(s) 539. IRC 510 can be connected to UPR 550, assuming IRC 510 is properly authenticated and/or satisfies security protocol(s), to facilitate determining and providing an immersive reality experience as disclosed elsewhere herein. UPR 550, in some embodiments, can be connected to CPR 540, e.g., directly, via UPR 552, etc. In some embodiments, CPR 540 can facilitate access to local CSSISC(s) 534 and remote CSSISCS(s) 535. Moreover, in some embodiments, CPR 540 can be connected to CPR 542. In an aspect, UPR 550 can be the same hierarchical level or a different hierarchical level as UPR 552. In an aspect, CPR 540 can be the same hierarchical level or a different hierarchical level as CPR 542.

In some example embodiments, system 500 can further comprise enterprise facility 507 that can comprise UPR 554, 556, etc., and can provide access to local USSISC(s) 568 and/or local USSISC(s) 569. IRC 512 can be connected to UPR 556, again assuming IRC 512 is properly authenticated and/or satisfies security protocol(s), to facilitate determining and providing an immersive reality experience as disclosed elsewhere herein. UPR 556, in some embodiments, can be connected to CPR 540, e.g., directly (not illustrated), via UPR 554, etc. In some embodiments, CPR 540 can facilitate access to local CSSISC(s) 534 and remote CSSISCS(s) 535. In an aspect, UPR 554 can be the same hierarchical level or a different hierarchical level as UPR 556. In system 500, IRC 510 can access local USSISC(s) 568, e.g., via CPR 540, UPR 554, and UPR 556, via UPR 552, CPR 540, UPR 554, UPR 556, or via other non-illustrated connections. This illustrates a benefit of the disclosed subject matter, wherein data stored locally at different enterprise facilities, e.g., enterprise facilities 506 and 507, can still be accessible via a CP RCEC, e.g., CPR 540.

In an aspect, a movable device can comprise a UPR, e.g., a car can comprise UPR 558, etc., as is illustrated. The structure of the disclosed subject matter allows for movable UPRs, e.g., UPRs in a movable device, to change connectivity. As an example, where IRC 514 is connected to UPR 558, it can initially be connected to CPR 540 via UPR 550, etc. In this example, a connectivity to CPR 540 can be better, faster, lower latency, lower jiggle, less error, etc., via UPR 550, for example, where UPR 558 is close to UPR 550 and where a wired connection between UPR 550 and CPR 540 is also very fast and stable, and thus can provide a strong stable connection that can be preferable to a direct over-the-air connection to CPR 540, e.g., via a distant RAN node, etc. However, as the car moves closer to the example RAN node and further from UPR 550, the state of the direct connection between UPR 558 and CPR 540 can improve sufficiently to trigger a handover of UPR 558 from UPR 540 to CPR 540. In some embodiments, both illustrated the connection to CPR 540, e.g., directly and via UPR 550, can be sustained. Moreover, although not illustrated for clarity, further movement of the car, e.g., towards UPR 556, etc., can similarly result in altering the connectivity of the devices, for example, to connect UPR 558 to CPR 540 via UPR 556 and UPR 554, etc. Also not illustrated for clarity and brevity, movement of an IRC can result in the IRC connecting different UPRs, more than one UPR, or combinations thereof. As an example, where the driver of the car exits the vehicle in the parking lot of enterprise facility 506, IRC 514 can gain a connection to UPR 550, etc. As another example, where a driver (or passenger) enters the vehicle, IRC 514 can connect to UPR 558 and thence to UPR 550, CPR 540, etc.

Figure 6:
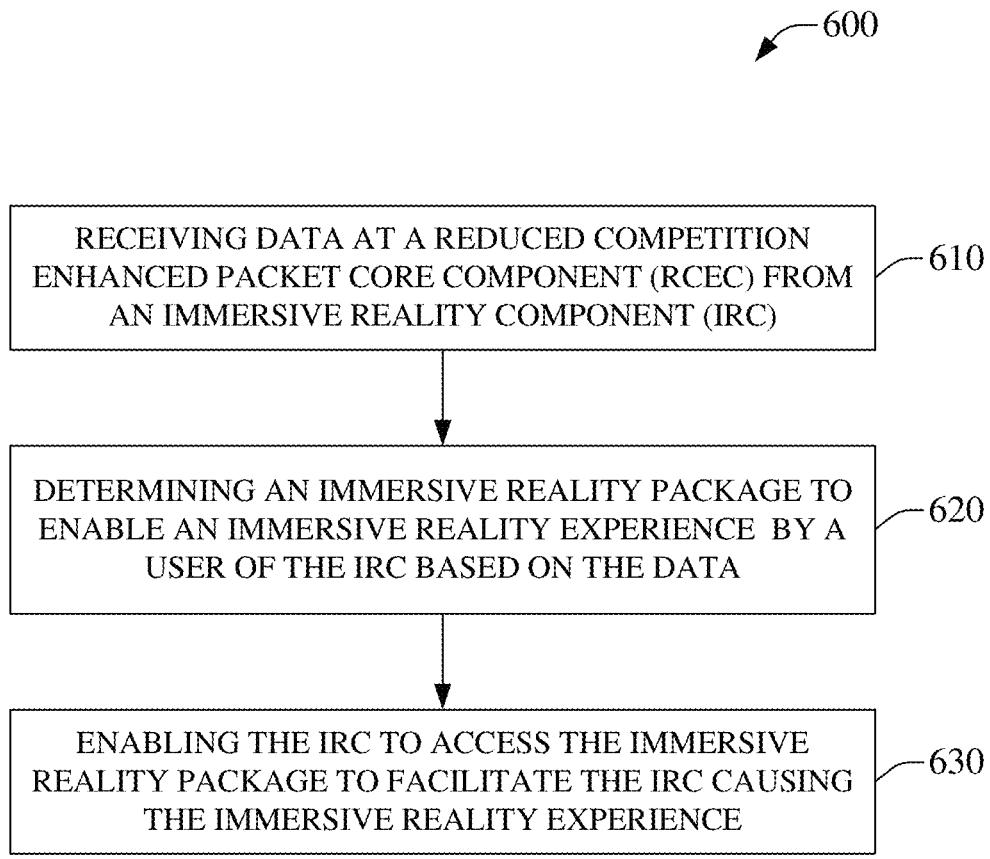
FIG. 6 is an illustration of an example method that can facilitate management of an immersive reality component via a reduced competition evolved packet core component, in accordance with aspects of the subject disclosure.
Figure 7:
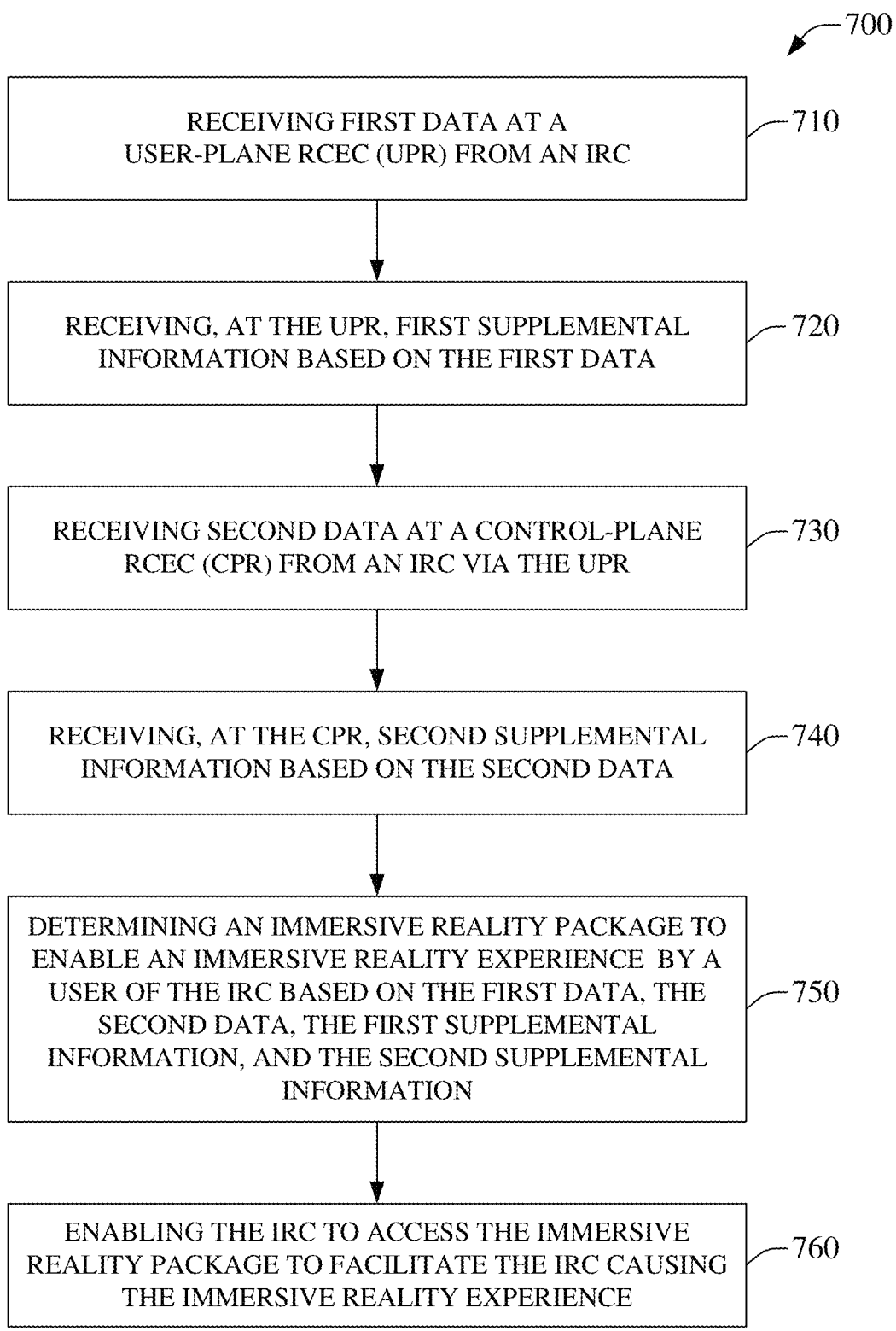
FIG. 7 illustrates an example method facilitating management of an immersive reality component via a user-plane reduced competition evolved packet core component and control-plane reduced competition evolved packet core component, in accordance with aspects of the subject disclosure.
Figure 8:
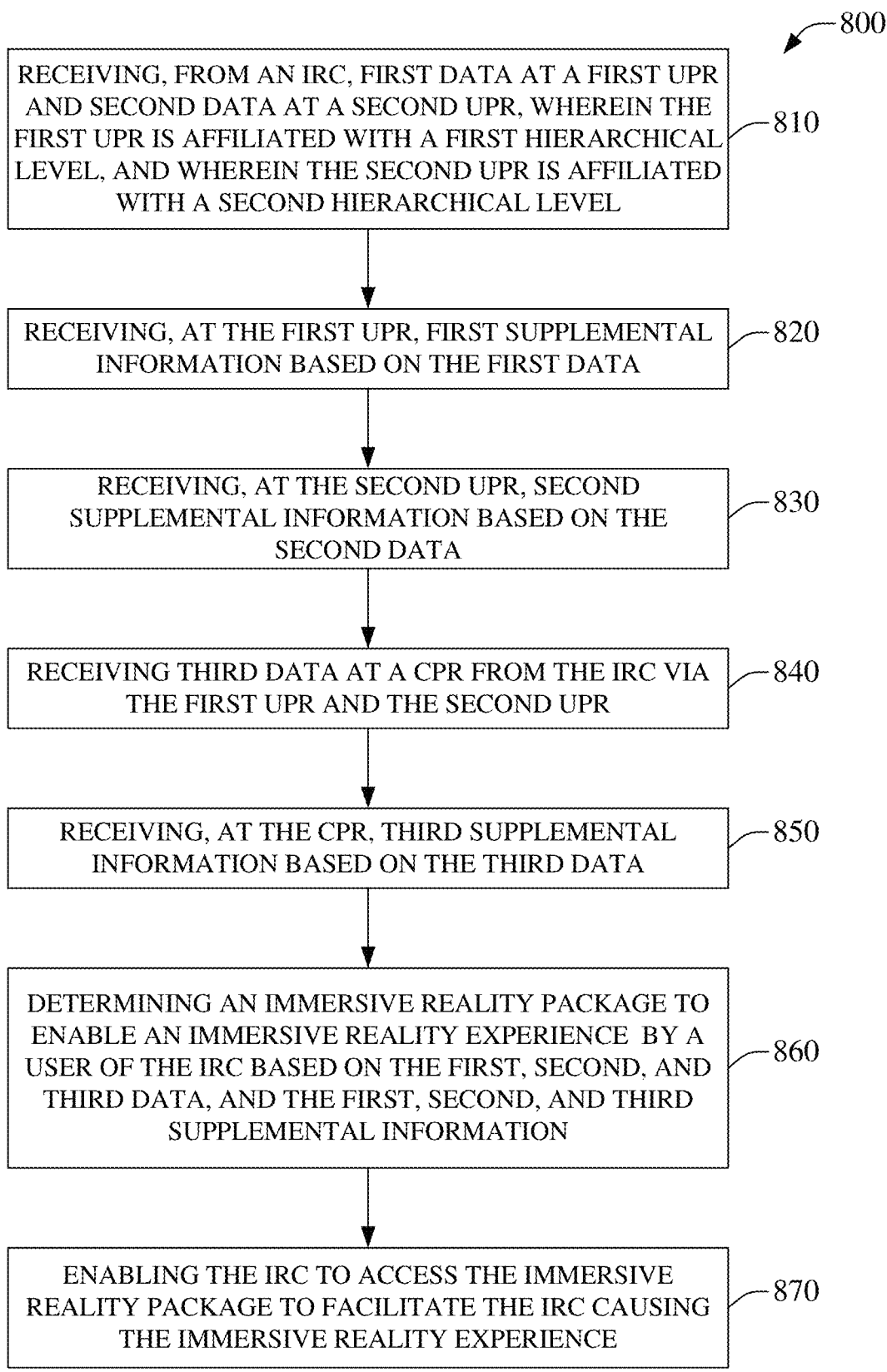
FIG. 8 illustrates an example method enabling management of an immersive reality component via a hierarchical reduced competition evolved packet core component scheme, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 facilitating management of an immersive reality component via a reduced competition evolved packet core component, in accordance with aspects of the subject disclosure. At 610, method 600 can comprise receiving data at a reduced competition evolved packet core component (RCEC) from an immersive reality component (IRC). The data received can comprise sensor data from the IRC, wherein the sensor data can comprise environmental data such as orientation, movement, direction, temperature, imagery, audio, location, etc. Moreover, the sensor data can comprise user input received via a sensor of the IRC or a device connected to or comprising the IRC, e.g., a user touch of a button or capacitive sensor, a user induced movement, a user induced pause in movement, user eye tracking, user gesture detection, etc.

At 620, method 600 can comprise determining, based on the data, an immersive reality package to enable an immersive reality experience by a user of the IRC. An IRC can offload computing resources from the IRC to a network component, e.g., the IRC can become 'thinner' by shifting computation of images, sounds, etc., from a wearable device to a network device. This 'thinner IRC' can additionally result in reduced power consumption. A 'thinner IRC' can therefore weigh less, be less bulky, generate less heat load, consume less power, etc., resulting in an IRC that can be more comfortable to wear, use, etc. In contrast to a conventional carrier network, where core network components can typically be designed for use with other types of devices, such as phones, tablets, laptops, IoT devices, etc., and where IRC computing demands are typically greater than the other devices, the disclosed subject matter employs reduced competition EPC components (RCECs) in a carrier network to provide IRC support, rather than further burdening conventional EPC components where there can already be a high level of competition for computing resources, and which can result in unsatisfactory IRC performance. In some embodiments, an RCEC can be explicitly dedicated to supporting an IRC, e.g., the RCEC explicitly deny any support for a phone, tablet, laptop, IoT, etc., device. In some embodiments, a RCEC can preferentially support an IRC, but can still provide support for other types of devices, e.g., where the RCEC has unused capacity, that unused capacity can be allocated to support other types of devices.

Method 600, at 630, can comprise enabling access by the IRC to the immersive reality package to facilitate the IRC causing the immersive reality experience. At this point method 600 can end. The immersive reality package can comprise data representing instructions, images, sound, haptic feedback, etc., that can be implemented by the IRC or a device comprising or connected to the IRC to cause a user to experience the immersive reality. As an example, the immersive reality package can comprise information that can cause a wearable device comprising the IRC to generate an overlay of a displayed/viewed image in real time, or nearly real time, e.g., displaying as soon as is possible rather than after some unnecessary delay, wherein the overlay can illustrate text or graphic instructions, enhancement of portions of the displayed/viewed image, provide additional information relative to the displayed/viewed image, provide context about events outside of the displayed/viewed image such as approaching objects, beyond sight elements, object, events, etc., or nearly any other form of augmented reality, virtual reality, mixed reality, etc.

FIG. 7 illustrates example method 700 enabling management of an immersive reality component via a user-plane reduced competition evolved packet core component and control-plane reduced competition evolved packet core component, in accordance with aspects of the subject disclosure. Method 700, at 710, can comprise receiving first data at a user-plane reduced competition evolved packet core component (UPR) from an immersive reality component (IRC). The data received can comprise sensor data from the IRC, wherein the sensor data can comprise environmental data such as orientation, movement, direction, temperature, imagery, audio, location, etc. Moreover, the sensor data can comprise user input received via a sensor of the IRC or a device connected to or comprising the IRC, e.g., a user touch of a button or capacitive sensor, a user induced movement, a user induced pause in movement, user eye tracking, user gesture detection, etc.

At 720, method 700 can comprise the UPR receiving first supplemental information based on the first data. The first data can be employed to gather other information, e.g., supplemental information, from supplemental information sources. As an example, image sensor data from an image sensor of the IRC can comprise an image of a roadway from the perspective of the driver, and location sensor data can indicate a location of the IRC, e.g., in a vehicle on the roadway of the image, such that the location and the roadway image can be used to identify placement, location, orientation, etc., of the IRC to allow gathering of supplemental information, such as, a speed limit, a road hazard being approached, locations of nearby gas/service stations, etc. Moreover, the image data can be employed to infer what type of vehicle the IRC is in, which combined with a user profile can be used to extract a vehicle identifier (e.g., make/model of the vehicle, VIN number, etc.) that can then be used to query performance metrics of the vehicle in real time, or near real time (e.g., as soon in time as possible, rather than after some arbitrary delay), such as brake temperature, oil pressure, vehicle speed, engine speed, mileage, etc. Additional data can also be combined with the IRC sensor data and user profile to infer the vehicle type and help determine performance metrics, such as data from the vehicle itself if locally accessible to the IRC, e.g., through a wired and/or wireless, e.g., Bluetooth, etc., connection between the IRC and one or more on-board computing systems of the vehicle, or through integration of the IRC into the vehicle design itself, as where the IRC user experience is provided through a heads-up display in the vehicle.

At 730, method 700 can comprise receiving second data at a control-plane reduced competition evolved packet core component (CPR) from the IRC. The second data received can similarly comprise sensor data from the IRC. The second data can be employed by method 700, at 740, to cause the CPR to receive second supplemental information based on the second data.

At 750, method 700 can comprise determining, based on the first data, the second data, the first supplemental information, and the second supplemental information, an immersive reality package to enable an immersive reality experience by a user of the IRC. By implementing an RCEC in a control-plane/user-plane scheme, some RCEC resources can be moved closer to an IRC. By allowing a UPR to perform some processing and supplemental information gathering, less information needs to be moved over a carrier network to core-network based RCEC components, e.g., CPRs. However, the CPR can still be employed to gather additional information, e.g., second supplemental information, etc., that may not be as readily accessible via a UPR. Accordingly, combinations of UPR and CPR topologies can facilitate access to computing resources, local/remote data, etc., on both the enterprise side and the carrier side, e.g., enterprise side via the UPR, and carrier network side via the CPR.

Additionally, use of enterprise side RCECs, e.g., UPRs, can facilitate customer directed authentication and security because authentication and security of the carrier network is separated, and can still be controlled by the carrier, from the customer directed authentication and security process. The implementation of authentication and security via a UPR can allow for authentication and security to be more specific to the demands of IRCs, IRC data, etc., more especially where directed by an entity such as a company, corporation, or other enterprise-type entity. Moreover, the UPR can still access core network services, applications, etc., via the CPR, such that these features do not need to be replicated at the enterprise level. Services, applications, information, etc., can include voice services, billing services, data/internet services, location services, traffic services, weather services, etc.

Method 700, at 760, can comprise enabling access by the IRC to the immersive reality package to facilitate the IRC causing the immersive reality experience. At this point method 700 can end. An immersive reality package can comprise data representing instructions, images, sound, haptic feedback, etc., that can be implemented by the IRC or a device comprising or connected to the IRC to cause a user to experience the immersive reality.

FIG. 8 illustrates example method 800, which can facilitate management of an immersive reality component via a hierarchical reduced competition evolved packet core component scheme, in accordance with aspects of the subject disclosure. Method 800, at 810, can comprise receiving first data from an IRC at a first UPR and receiving second data from the IRC at a second UPR. The first UPR can be of a first hierarchical level and the second UPR can be of a second hierarchical level. In some embodiments the first and second hierarchical levels can be different hierarchical levels. In some embodiments the first and second hierarchical levels can be the same hierarchical levels. The first and second data received can comprise sensor data from the IRC, wherein the sensor data can comprise environmental data such as orientation, movement, direction, temperature, imagery, audio, location, user input, etc. Moreover, the sensor data can comprise user input received via a sensor of the IRC or a device connected to or comprising the IRC, e.g., a user touch of a button, capacitive sensor, etc., a user induced movement, a user induced pause in movement, user eye tracking, user gesture detection, etc.

At 820, method 800 can comprise the first UPR receiving first supplemental information based on the first data. The first data can be employed to gather other information, e.g., supplemental information, from supplemental information sources. At 830, method 800 can comprise the second UPR receiving second supplemental information based on the second data. The first and second data can be employed by different UPRs to correspondingly gather other information, e.g., different supplemental information can be gathered by each UPR from supplemental information sources based on the first and second data.

At 840, third data can be received at a CPR from the IRC. The third data received can similarly comprise sensor data from the IRC. The third data can be employed by method 800, at 850, to cause the CPR to receive third supplemental information based on the third data.

At 860, method 800 can comprise determining, based on the first data, the second data, the third data, the first supplemental information, the second supplemental information, and the third supplemental information, an immersive reality package to enable an immersive reality experience by a user of the IRC. By implementing an RCEC in a control-plane/user-plane scheme, some RCEC resources can be moved closer to an IRC. By allowing a UPR to perform some processing and supplemental information gathering, less information needs to be moved over a carrier network to core-network based RCEC components, e.g., CPRs. Moreover, hierarchical topology of the user-plane and/or control plane RCECs can allow controlled access to different information, e.g., first and second supplementary information, etc., controlled joint access to computing resources, etc. Moreover, the CPR can again be employed to gather still further information, e.g., third supplemental information, etc., that may not be as readily accessible via a UPR. Accordingly, combinations of UPR and CPR topologies, especially hierarchical topologies, can facilitate controlled access to computing resources, local/remote data, etc., on both the enterprise side and the carrier side, e.g., enterprise side via the UPR, and carrier network side via the CPR.

Method 800, at 860, can comprise enabling access by the IRC to the immersive reality package to facilitate the IRC causing the immersive reality experience. At this point method 800 can end. An immersive reality package can comprise data representing instructions, images, sound, haptic feedback, etc., that can be implemented by the IRC or a device comprising or connected to the IRC to cause a user to experience the immersive reality.

Here is an example use case that provides a further illustration of aspects of the invention. Referring once again to FIG. 4, an aircraft manufacturing plant can deploy a system (e.g., system 400) that can be employed frequently by employees, including aircraft technicians, to experience immersive reality, e.g., in regard to various work areas within the plant, of the aircraft components being manufactured in each area, etc. In this example, when a technician arrives at the plant at the start of the work day, she can don a company-furnished IRC (e.g., any available one of IRCs 410-414). The IRC can send information about the technician (e.g., biometric information, eye tracking, etc.), her surroundings, etc., to a middle-tier UPR (e.g., UPR 452) or an upper-tier UPR (e.g., UPR 454). The connection between technician's IRC and the UPR with which it initially communicates can be direct (although not shown for IRCs 410-414 in FIG. 4, this can be similar to the connections that are illustrated between IRC 416 and UPR 452 and between IRC 418 and UPR 454). The UPR can notify a CPR (e.g., CPR 440) of the technician's arrival at work and of the activation of her IRC. Continuing the example, the technician can proceed to a work area in the plant. Based on what the technician's IRC "sees," the IRC's location, other IRC sensor data, inputs from the technician (or from another user of system 400, such as her supervisor), supplemental information (e.g., from a job assignment database), etc., a UPR at a lower tier of the hierarchy (e.g., UPR 450) can be initiated, provisioned, instantiated, awoken, activated, etc., and can be made accessible to the technician's IRC. The IRC's direct connection can then be handed off to the lower-tier UPR, and various applications can be started. In an aspect, the IRC can also be connected to, and/or interact with, multiple tiers of UPR/CPR, e.g., the technician's IRC can connect to the lower-tier UPR to support some functionality while also remaining connected to the middle-tier UPR to support other functionality. The technician, assisted by the immersive reality views that she experiences through the IRC, can perform tasks, etc. Where the technician can move from one section of the aircraft to another, appropriate applications can be activated, for example, based on the movement, change in location, change in sense environment, user input, etc. As an example, if the technician is working on a first avionics component, a first corresponding group of avionics applications supporting the type of aircraft and the first avionics located at the technician's current position in or on the aircraft can be activated, but when the technician moves to a second avionics component, a second corresponding group of avionics applications supporting the type of aircraft and the second avionics can be activated, etc.

Continuing in this example, suppose that the technician has a different job assignment later in her work day, which can be in another work area located elsewhere in the plant. When she proceeds to that work area, her IRC's direct connection with the previous lower-tier UPR (e.g., UPR 450) can be handed off to another lower-tier UPR (e.g., UPR 451). The handoff may proceed directly or with an intermediate step in which the IRC is briefly connected with a middle- or upper-tier UPR (e.g., UPR 452 or 454) that assists with the handoff. In any case, once the IRC is connected with the new lower-tier UPR (e.g., UPR 451), a different set of applications can be activated. The technician can perform her work, once again assisted by the immersive reality views that she experiences through the IRC, further tasks, etc. In an example, if the technician is working on a window or door assembly, a group of mechanical assembly applications supporting that type of aircraft and the technician's particular window or door can be activated. More generally, UPRs can enable access by other UPRs and CPRs to changes in the technician's (e.g., technician's IRC's) position, location, environment, etc., e.g., changes to the technician's work functions/environment. In an aspect, this can include supporting collaboration of the technician with other users (e.g., other technicians, supervisors, etc.) via presenting a corresponding immersive reality experience. By shifting some, if not all, of the burden of running IRC applications used by the technician throughout the work day to UPRs and/or CPRs, rather than running the applications on the IRC itself, the IRC can be a 'thinner' device, e.g., the IRC form factor can be significantly reduced due to the processing power being offloaded to UPRs and CPRs. This can reduce user fatigue, improve user access to tight areas that may not be suitable for a larger/bulkier IRC, etc., extend battery life of an IRC (or allow for smaller/lighter batteries), etc.

Figure 9:
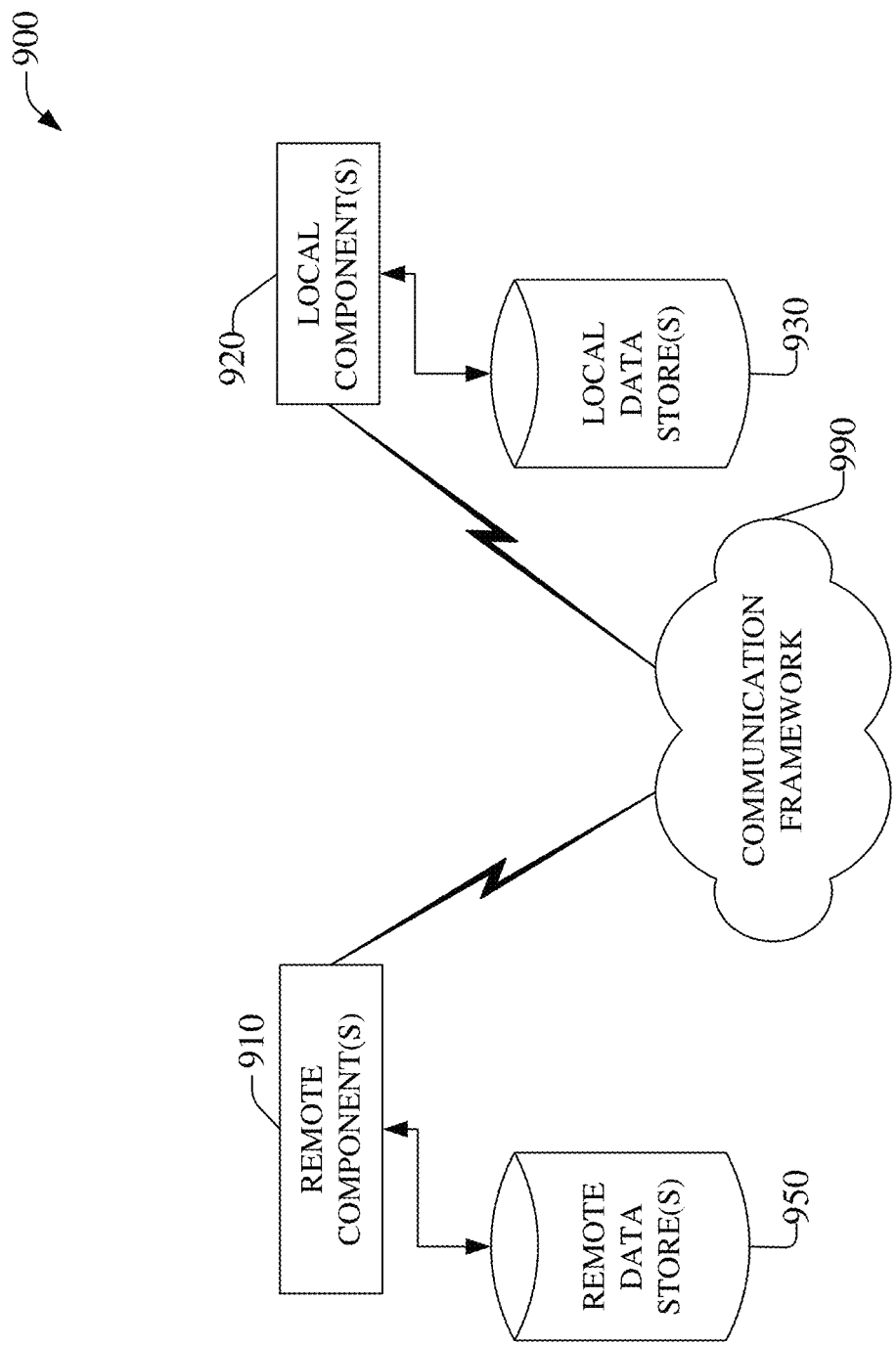
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise IRC 110, 210, 310-318, 410-418, 510-514, etc., UPR 250, 350-358, 450-456, 550-558, etc., USSISC 236, etc., local USSISC(s) 338, 538, 568, 569, etc., remote USSISC(s) 339, 539, etc., remote CSSISC(s) 335, 535, etc., or other remotely located components.

The system 900 also comprises one or more local component(s) 920. The local component(s) 920 can be hardware and/or software (e.g., threads, processes, computing devices). In some embodiments, local component(s) 920 can comprise RCEC 120, etc., SISC 130, etc., CPR 240, 340-344, 440-449, 540-542, etc., CSSISC 232, etc., local CSSISC(s) 334, 534, etc., or other locally located components.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, via a 5G network, etc. Remote component(s) 910 can be operably connected to one or more remote data store(s) 950, such as a hard drive, solid state drive, SIM card, device memory, etc., that can be employed to store information on the remote component(s) 910 side of communication framework 940. As an example, remote USSISC(s) 339 can store supplementary information that can be accessed based on data received at a UPR from an IRC, remote CSSISC(s) 335 can store other supplementary information that can be accessed based on data received at a CPR from an IRC, etc. Similarly, local component(s) 920 can be operably connected to one or more local data store(s) 930, that can be employed to store information on the local component(s) 920 side of communication framework 940. As an example, local USSISC(s) 338 can store supplementary information that can be accessed based on data received at a UPR from an IRC, local CSSISC(s) 334 can store other supplementary information that can be accessed based on data received at a CPR from an IRC, etc.

Figure 10:
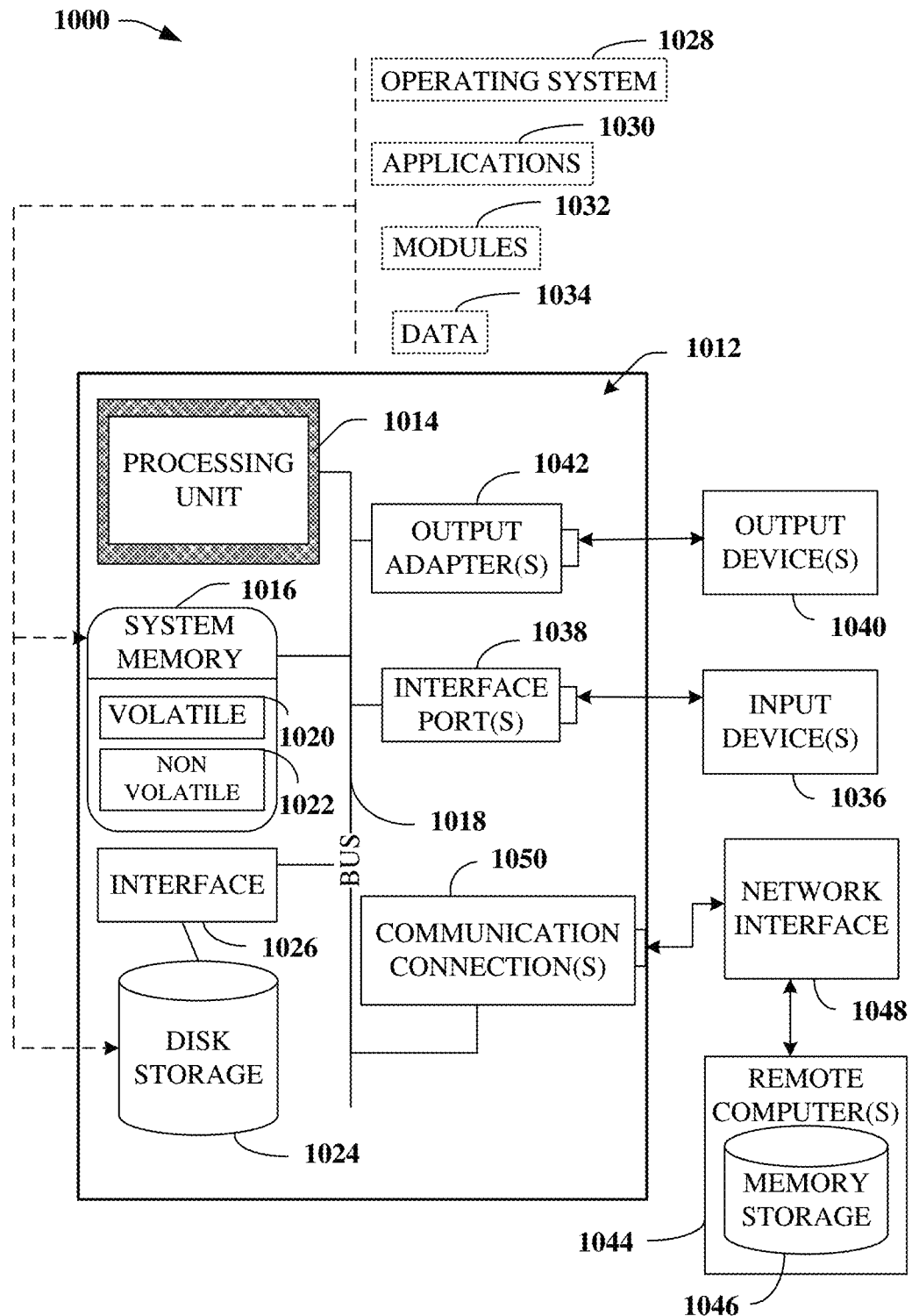
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, included in IRC 110, 210, 310-318, 410-418, 510-514, etc., UPR 250, 350-358, 450-456, 550-558, etc., USSISC 236, etc., local USSISC(s) 338, 538, 568, 569, etc., remote USSISC(s) 339, 539, etc., remote CSSISC(s) 335, 535, etc., RCEC 120, etc., SISC 130, etc., CPR 240, 340-344, 440-449, 540-542, etc., CSSISC 232, etc., local CSSISC(s) 334, 534, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining immersive reality content based, at least in part, on contextual data in response to receiving a portion of the contextual data from an immersive reality device, wherein the first processor exclusively receives immersive reality device traffic, and enabling access to a immersive reality content data package by the immersive reality device, wherein the immersive reality content data package enables implementation of the immersive reality content by the immersive reality device.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to as extremely high frequency (EHF) waves. The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a first processor; and
   a memory that stores executable instructions that, when executed by the processor, facilitate performance of operations, comprising:
      receiving contextual data from a sensor of a user equipment in an environment;
      determining immersive reality content based on the contextual data, wherein the first processor and the memory are comprised in a first network and, as a defined priority, selectively reject generic evolved packet core network traffic causing rejected generic evolved packet core network traffic to traverse a second processor comprised in a second network that is in parallel with the first network, as a result of which, transporting the immersive reality content via the first network competes less for evolved packet core computing resources of the first network via the rejection of the generic evolved packet core network traffic in comparison to not excluding the generic evolved packet core network traffic from the first network, wherein the second processor is located remotely from the first processor, wherein the first network comprises a user-plane device that is deployed geographically separate from a control-plane device comprised in the second network, wherein the first network is a first evolved packet core network, wherein the second network is a second evolved packet core network, and wherein the first network is adapted to transport the immersive reality content and is a different network than the second network that is adapted to transport the generic evolved packet core network traffic; and
      enabling access to implementation data, wherein the implementation data enables implementation of the immersive reality content by the user equipment.

2. The device of claim 1, wherein the sensor is a component of the user equipment.

3. The device of claim 2, wherein the user equipment is a wearable user equipment.

4. The device of claim 1, wherein determining the immersive reality content occurs in response to receiving the contextual data from the sensor.

5. The device of claim 4, wherein determining the immersive reality content facilitates an augmented reality experience via the user equipment.

6. The device of claim 1, wherein the first processor and the memory facilitate a first user-plane portion of the first network comprised in a core network via the user-plane device, and wherein the operations occur in the first user-plane portion of the core network.

7. The device of claim 6, wherein the user equipment is a first user equipment, wherein the immersive reality content is first immersive reality content, wherein the first processor and the memory that facilitate the first user-plane portion of the core network further facilitate a second user-plane portion of the core network, and wherein the second user-plane portion facilitates determining second immersive reality content for implementation by a second user equipment.

8. The device of claim 6, wherein the memory is a first memory, wherein the contextual data is first contextual data, and wherein determining the immersive reality content is further based on second contextual data received via a control-plane portion of the second network comprised in the core network via the control-plane device, and wherein the control-plane portion of the core network is facilitated by a third processor and a second memory comprised in the control-plane device.

9. The device of claim 8, wherein the defined priority is a first defined priority, and wherein the third processor and the second memory reject, according to a second defined priority, the generic evolved packet core network traffic, resulting in the immersive reality content not competing for the evolved packet core computing resources consumed by the generic evolved packet core network traffic.

10. The device of claim 1, wherein the sensor of the user equipment comprises an image sensor.

11. The device of claim 1, wherein the sensor of the user equipment comprises an audio sensor.

12. The device of claim 1, wherein the sensor of the user equipment comprises a location sensor.

13. The device of claim 1, wherein the sensor of the user equipment comprises an orientation sensor.

14. A method, comprising:
receiving from an immersive reality device, by a system employing a control-plane and user-plane separation topology and comprising a first processor of a first network in parallel with a second network comprising a second processor, contextual data, wherein the first processor is located remotely from the second processor, wherein the system receives immersive reality device traffic associated with the immersive reality device and excludes generic evolved packet core network traffic based on a level of available processing resources of the first processor resulting in shifting excluded generic evolved packet core network traffic to the second network, wherein communicating with the immersive reality device consumes fewer processing resources than where the first processor does not exclude the generic evolved packet core network traffic, wherein the first network is a first evolved packet core network, wherein the second network is a second evolved packet core network, and wherein the first network is adapted to transport the immersive reality content and is a different network than the second network that is adapted to transport the generic evolved packet core network traffic;
determining, by the system, immersive reality content based on the contextual data from the immersive reality device; and
enabling, by the system, access to implementation data by the immersive reality device, wherein the implementation data enables implementation of the immersive reality content by the immersive reality device.

15. The method of claim 14, wherein determining the immersive reality content occurs contemporaneous to the receiving of the contextual data from the immersive reality device.

16. The method of claim 14, wherein the enabling of the access to the implementation data by the immersive reality device comprises enabling the access to a device selected from a group of devices comprising a HOLOLENS device, a MAGIC LEAP device, an augmented reality device, a virtual reality device, and a mixed reality device.

17. The method of claim 14, wherein:
the first processor is comprised in a user-plane reduced competition evolved packet core device in accord with the control-plane and user-plane separation topology; the receiving of the contextual data from the immersive reality device comprises:
receiving first contextual data by the first processor; and
receiving first supplemental information by the first processor based on the first contextual data; and
in response to a third processor of a control-plane reduced competition evolved packet core device, in accord with the control-plane and user-plane separation topology, receiving second contextual data and receiving second supplemental information based on the second contextual data, the determining of the immersive reality content based on the contextual data from the immersive reality device then comprises determining the immersive reality content based on the first contextual data, the second contextual data, the first supplemental information, and the second supplemental information.

18. A non-transitory machine-readable medium, comprising executable instructions that, when executed by a first processor, facilitate performance of operations, comprising:
in response to receiving a portion of contextual data from an immersive reality device attached to a system supporting separation of a network control-plane and a network user-plane, determining immersive reality content based on the portion of contextual data, wherein the portion of contextual data is communicated to evolved packet core equipment via an evolved packet core network that comprises the first processor in a first network in parallel with a second network comprising a generic packet core processor, wherein the first processor is located remotely from the generic packet core processor, wherein the first processor exclusively receives immersive reality device traffic as a result of steering the portion of contextual data away from the first network and into the second network, wherein the first network is a first evolved packet core network, wherein the second network is a second evolved packet core network, and wherein the first network is adapted to transport the immersive reality content and is a different network than the second network that is adapted to transport the generic evolved packet core network traffic; and
enabling access to an immersive reality content data package by the immersive reality device, wherein the immersive reality content data package enables implementation of the immersive reality content by the immersive reality device.

19. The non-transitory machine-readable medium of claim 18, wherein the contextual data comprises first contextual data employed by the first processor to determine first supplemental information and second contextual data employed by a second processor to determine second supplemental information, and wherein determining the immersive reality content is further based on the first supplemental information and the second supplemental information.

20. The non-transitory machine-readable medium of claim 19, wherein the first processor is a first user-plane processor, wherein the first user-plane processor is at a different hierarchical level of a defined hierarchy than the second user-plane processor, and wherein the first user-plane processor and the second user-plane processor are separated from a control-plane processor in accord with the system supporting a control-plane and a user-plane separation topology.

* * * * *